United States Patent
Sielhorst et al.

(10) Patent No.: US 11,512,979 B2
(45) Date of Patent: Nov. 29, 2022

(54) SENSOR DEVICE FOR A TOWING VEHICLE COUPLING

(71) Applicant: WESTFALIA-AUTOMOTIVE GMBH, Rheda-Wiedenbrück (DE)

(72) Inventors: Bernhard Sielhorst, Rheda-Wiedenbrück (DE); Stefan Röring, Bielefeld (DE)

(73) Assignee: WESTFALIA-AUTOMOTIVE GMBH

( * ) Notice: Subject to any disclaimer, the term of this patent is extended or adjusted under 35 U.S.C. 154(b) by 213 days.

(21) Appl. No.: 16/763,355

(22) PCT Filed: Nov. 22, 2018

(86) PCT No.: PCT/EP2018/082193
§ 371 (c)(1),
(2) Date: May 12, 2020

(87) PCT Pub. No.: WO2019/101847
PCT Pub. Date: May 31, 2019

(65) Prior Publication Data
US 2020/0292353 A1    Sep. 17, 2020

(30) Foreign Application Priority Data

Nov. 23, 2017 (DE) .................. 10 2017 127 743.9
Jul. 4, 2018 (DE) .................. 10 2018 116 189.1

(51) Int. Cl.
*G01D 5/14* (2006.01)
*B62D 53/08* (2006.01)
*G01D 11/24* (2006.01)

(52) U.S. Cl.
CPC ............. *G01D 5/145* (2013.01); *B62D 53/08* (2013.01); *G01D 11/245* (2013.01)

(58) Field of Classification Search
CPC ....... G01D 5/145; G01D 11/245; B62D 53/08
See application file for complete search history.

(56) References Cited

U.S. PATENT DOCUMENTS

| 5,033,798 | A | * | 7/1991 | Breen ..................... B60T 13/66 |
| | | | | 188/112 A |
| 5,152,544 | A | | 10/1992 | Dierker et al. |
| 9,556,911 | B2 | * | 1/2017 | Moratz ................. F16C 33/784 |

FOREIGN PATENT DOCUMENTS

| DE | 19964045 A1 | 7/2001 |
| GB | 2470610 A | 12/2010 |
| WO | 2005028220 A1 | 3/2005 |

OTHER PUBLICATIONS

English Translation of International Search Report dated Feb. 22, 2019; International Patent Application No. PCT/EP2018/082193 filed Nov. 22, 2018. ISA/EP.

* cited by examiner

*Primary Examiner* — Reena Aurora
(74) *Attorney, Agent, or Firm* — McDonald Hopkins LLC

(57) ABSTRACT

Disclosed is a sensor device for a towing vehicle coupling or as a component of a towing vehicle coupling, in particular a fifth-wheel coupling, with which a trailer vehicle can be coupled to a towing vehicle wherein the towing vehicle coupling has a coupling element for detachably coupling to a coupling counter element, in particular a fifth-wheel king pin, wherein the coupling element is/can be secured to the towing vehicle and the coupling counter element is/can be secured to the trailer vehicle, and in the coupled state forming a joint, they can rotate relative to one another about at least one joint rotational axis, wherein the sensor device has a follower, mounted on a bearing body such that it can rotate about a follower rotational axis, for detecting a rotation of the coupling counter element relative to the (Continued)

Figure 1:
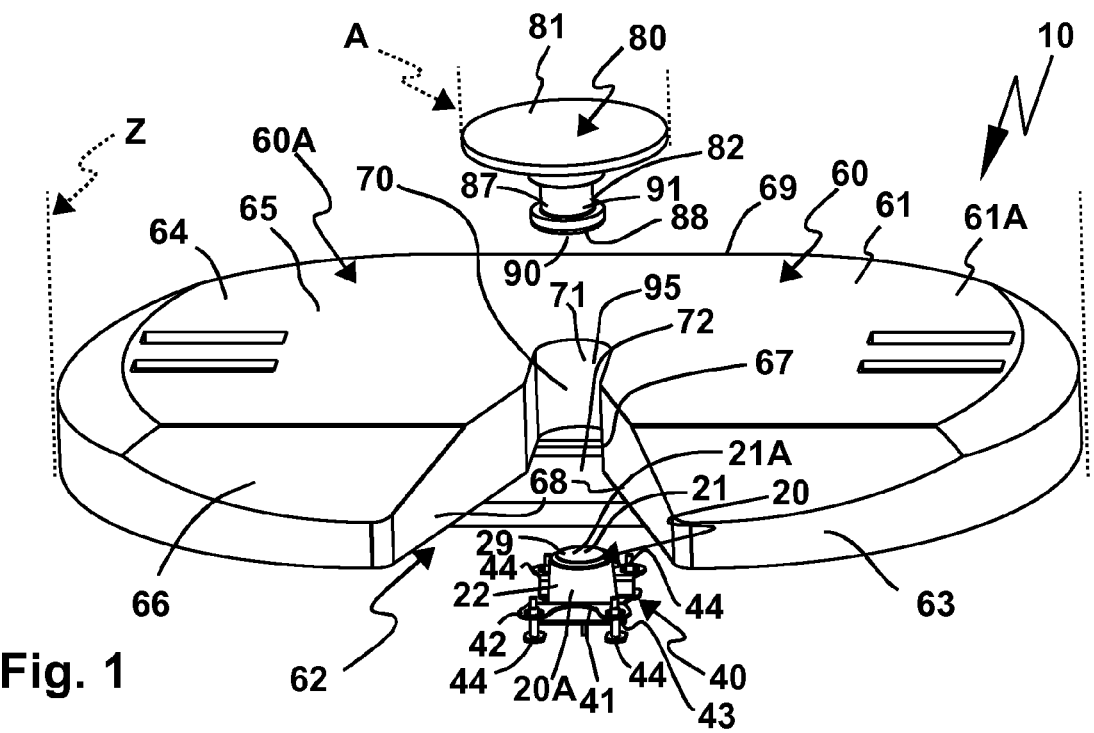

coupling element about the at least one joint rotational axis wherein the follower can rotate about the follower rotational axis by rotationally following the coupling counter element in a rotation about the at least one joint rotational axis, and the sensor device has at least one sensor for detecting a respective rotational position of the follower relative to the bearing body in relation to the follower rotational axis. The follower is arranged outside a bearing region of the joint, in which the coupling element and the coupling counter element are engaged with one another in a bearing manner, and the at least one sensor is arranged inside the follower and/or the follower forms a protective housing for the at least one sensor.

39 Claims, 10 Drawing Sheets

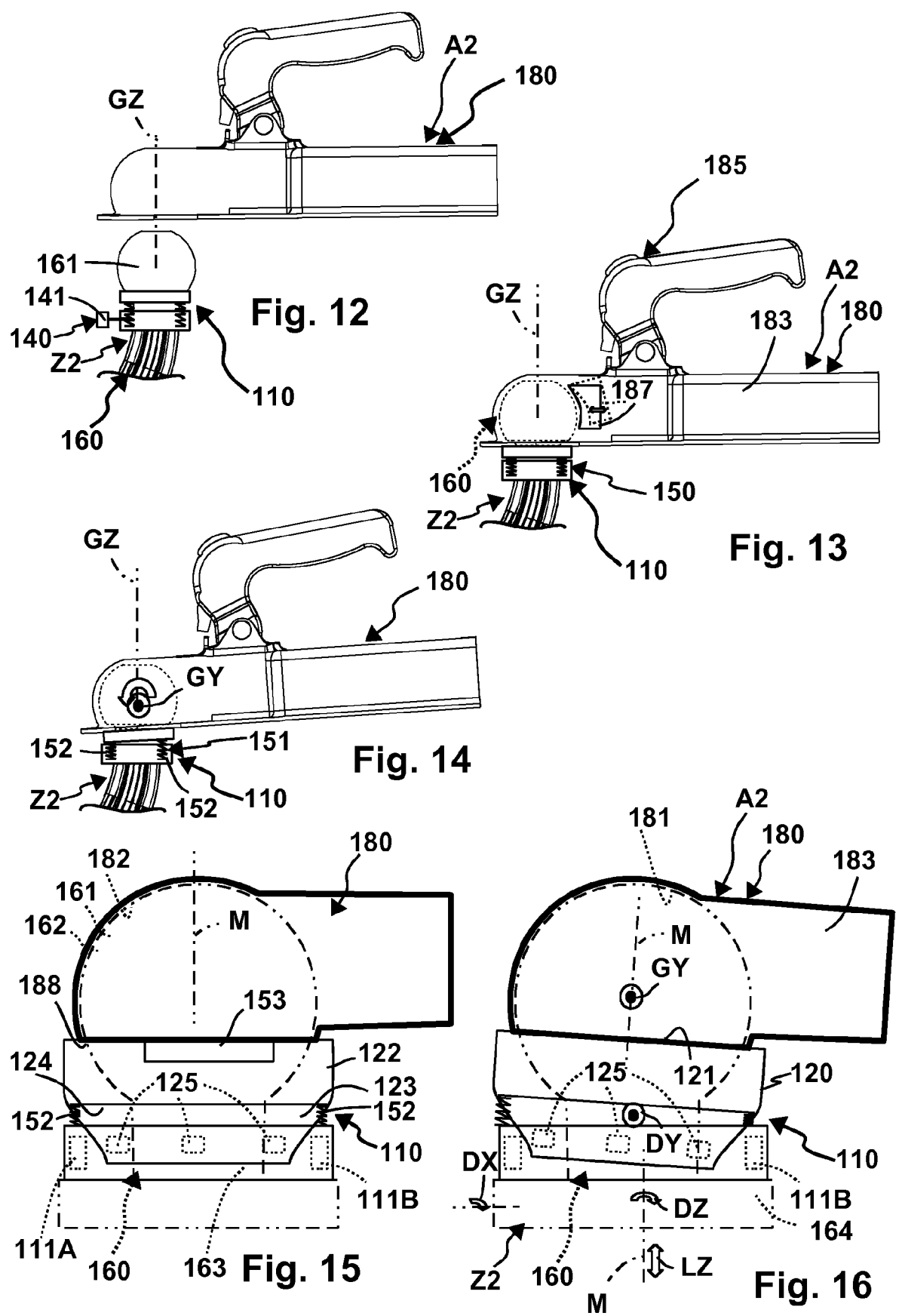

SENSOR DEVICE FOR A TOWING VEHICLE COUPLING

CROSS-REFERENCE TO RELATED APPLICATION

This application is a 35 U.S.C. § 371 national stage application of PCT Application No. PCT/EP2018/082193 filed on Nov. 22, 2018, entitled "SENSOR DEVICE FOR A TOWING VEHICLE COUPLING," which claims priority to German Patent Application No. 10 2017 127 743.9 filed on Nov. 23, 2017, and German Patent Application No. 10 2018 116 189.1 filed Jul. 4, 2018, each of which are incorporated herein in their entirety by reference.

The invention relates to a sensor device for a towing vehicle coupling or as a component of a towing vehicle coupling, in particular a fifth-wheel coupling, with which a trailer vehicle, in particular a semi-trailer, can be coupled to a towing vehicle, in particular a truck, wherein the towing vehicle coupling has a coupling element for detachably coupling a coupling counter element, in particular a king pin, wherein the coupling element can be secured to the towing vehicle and the counter coupling element to the trailer vehicle, and in the coupled state forming a joint, they can rotate relative to one another, wherein the sensor device has a follower, which is mounted on a bearing body such that it can rotate about a follower rotational axis for detecting a rotation of the coupling counter element relative to the coupling element about the at least one joint rotational axis, wherein the follower can rotate about the follower rotational axis (M) by rotationally following the coupling counter element in a rotation about the at least one joint rotational axis and the sensor device and has at least one sensor for detecting a respective rotational position of the follower relative to the bearing body in relation to the follower rotational axis. The invention also relates to a towing vehicle coupling with such a sensor arrangement.

The pin is referred to by the English: term 'king pin'. When the coupling counter element is coupled to the coupling element and thus to the towing vehicle coupling, the coupling counter element and therefore the trailer vehicle can rotate or pivot about the at least one joint rotational axis.

From DE 199 640 45 A1, by way of example, a sensor device and a corresponding towing vehicle coupling are known. However, the problem is that the sensor device and the follower are arranged in the external area and are exposed to environmental influences.

It is therefore the object of the present invention to provide an improved sensor device for a towing vehicle coupling of the abovementioned type.

To achieve this object, on a sensor device of the abovementioned type, it is provided that the follower is arranged outside of a bearing region of the joint, in which the coupling element and the coupling counter element are in supporting engagement with each other, and that the at least one sensor is arranged in an interior space of the follower and/or the follower forms a protective housing for the at least one sensor. To achieve this object, a towing vehicle coupling is also provided with such a sensor device.

A basic concept here is that the sensor device is arranged in the outside area, i.e. directly on the coupling receptacle or the coupling jaw, wherein the follower simultaneously protects the sensor. The sensor is arranged by way of example in the interior of the follower or in a protective housing, which is formed by the follower.

The bearing body is advantageously retained non-rotatably with respect to the follower rotational axis by means of an anti-rotation lock, which is provided for retaining the sensor device on the towing vehicle coupling.

Furthermore, the follower is not located directly in the bearing region, so that retrofitting an existing towing vehicle coupling is easier. The bearing region is in the power train between towing vehicle and trailer vehicle and highly mechanically loaded and is not weakened by the follower. A receiving space or installation space for the follower is not necessary.

The coupling element advantageously has a coupling receptacle, in particular a coupling jaw, for receiving a king pin of the coupling counter element.

A preferred embodiment of the invention or an invention which is in itself independent, in which the follower can also be arranged in the bearing region between coupling element and coupling counter element, can be defined in connection with what is known as a fifth wheel coupling as follows:

Sensor device for a towing vehicle coupling or as a component of a towing vehicle coupling, wherein the towing vehicle coupling is designed as a fifth-wheel coupling, with which a trailer vehicle in the form of a semi-trailer, can be coupled to a towing vehicle in the form of a truck, wherein the towing vehicle coupling has a coupling element for detachably coupling a coupling counter element, wherein the coupling element is or can be secured to the towing vehicle and the counter coupling element to the trailer vehicle, and in the coupled state forming a joint, they can rotate relative to one another about at least one joint rotational axis, wherein the coupling element has a coupling receptacle, in particular a coupling jaw, for receiving a king pin of the coupling counter element, wherein the sensor device has a follower, which is mounted on a bearing body such that it can rotate about a follower rotational axis for detecting a rotation of the coupling counter element relative to the coupling element about the at least one joint rotational axis, wherein the follower can rotate about the follower rotational axis by rotationally following the king pin in a rotation about the at least one joint rotational axis and the sensor device has at least one sensor for detecting a respective rotational position of the follower relative to the bearing body in relation to the follower rotational axis, characterised in that the at least one sensor is arranged in an interior space of the follower and/or that the follower forms a protective housing for the at least one sensor. In this case the follower can also be arranged on the bearing region between coupling element and coupling counter element.

A preferred concept provides that the sensor is arranged, so to speak, completely encapsulated or protected in the protective housing or the follower.

The follower is advantageously designed in the manner of a protective cap or protective cover. The follower can, by way of example, form a kind of cover or cap, in the interior of which the at least one sensor, preferably a sensor device, is arranged.

It is advantageous that no special measures are necessary on the king pin or in any event the coupling of the semi-trailer. On the contrary, the follower of the sensor device according to the invention is designed and provided for rotational following or rotational coupling with the king pin. The bearing body is arranged, or can be arranged, by way of example, on the coupling element of the towing vehicle. However, the bearing body can also be arranged on the coupling element or be formed by a section of the coupling element. So, by way of example, a bearing groove or a bearing projection, on which the follower is mounted, can be arranged on the coupling element of the towing vehicle coupling or fifth wheel coupling.

However, an embodiment in which the bearing body is designed as a separate body from the coupling element is particularly preferred.

With regard to the coupling element for providing the maintenance or follower coupling to the coupling element, the follower is preferably movably mounted with at least one degree of freedom of movement, by way of example a rotational degree of freedom, a sliding degree of freedom or similar, differing from the rotatability, about the follower rotational axis. So, therefore, the follower can be more easily held in follower coupling with the coupling counter element or the king pin.

A preferred embodiment provides that the sensor device is designed and/or provided for an arrangement in a receiving space of the towing vehicle coupling which is present in the coupling receptacle, by way of example the coupling jaw. Advantageously, a geometric configuration of the sensor device is such that it can be arranged in the receiving space. The receiving space is located, by way of example, below the coupling receptacle or next to a support plate of the towing vehicle coupling. The receiving space can be configured, by way of example, as a cavity, recess or similar. It is preferred if the receiving space is, so to speak, present in any case, i.e. that an existing towing vehicle coupling can be retrofitted with the sensor device.

It is advantageously provided that the follower for providing or maintaining a follower coupling to the coupling counter element is movably supported with at least one degree of freedom of movement different from the rotation about the follower rotational axis, in particular at least one rotational degree of freedom relative to the coupling element.

Advantageously, it is provided that the at least one degree of freedom of movement different from the rotatability about the follower rotational axis comprises at least one rotational degree of freedom and/or at least one linear degree of freedom of movement or degree of freedom of displacement.

It is advantageous if a displacement axis of the degree of freedom of displacement and a pivot axis of the at least one rotational degree of freedom intersect each other.

It is a basic concept here that the follower is mounted not only rotatable about the follower rotational axis with respect to the coupling element, but also with one or more further degrees of freedom of movement, which differ from the rotatability about the follower rotational axis or the rotational degree of freedom about the follower rotational axis. This allows the follower to, so to speak, be floated up into abutment or interconnection with the coupling counter element, by way of example a ball coupling.

The at last one degree of freedom of movement for providing the follower coupling or maintaining the same expediently comprises at least one linear degree of freedom of movement. So, by way of example, the follower can be mounted on the coupling element such that it can move with respect or parallel to the follower rotational axis towards or away from this or with respect to the coupling element. The displacement axis expediently runs parallel or at an angle of less than 90° to the follower rotational axis. The linear adjustment axis can also be pivotable about a rotational axis or pivot axis in the context of the at least one rotational degree of freedom.

Preferably, it is provided that the follower is mounted such that it can displace with respect to the coupling element along at least one displacement axis or linear axis, by way of example along a linear axis or displacement axis, which is coaxial or parallel to the follower rotational axis.

If the follower in addition to being rotatable about the follower rotational axis, is also mounted so that it can displace exclusively along a linear axis or displacement axis, it is preferably provided that it has a slide-on slope and/or at least one resilient or elastic component. The follower can then, by way of example, when coupling the coupling counter element to the coupling element, deviate along the linear axis or displacement axis and also yield transversely to the linear axis or displacement axis in order to enable or facilitate movement of the coupling counter element in contact with the follower so that the follower and the coupling counter element are or come into follower contact.

It is furthermore advantageous if the follower has at least one follower surface lying outside the joint, in particular a frictional engagement surface, positive engagement surface or similar, for following by the coupling counter element. By way of example, the follower surface is arranged outside of bearing surfaces of the coupling element and the coupling counter element with which the coupling element and the coupling counter element slide along one another. The follower surface is also advantageously arranged next to the coupling element and/or coupling counter element.

The bearing body which supports the follower about the follower rotational axis is, by way of example, mounted at a single bearing point on a component stationary with respect to the towing vehicle coupling, by way of example a support body of the towing vehicle coupling, so that it can move with respect to the at least one degree of freedom of movement, by way of example displace about a displacement axis and/or pivot or rotate about at least one pivot axis or rotational axis. This bearing point can lie in the axis line of the follower rotational axis or be coaxial with it. By way of example, the displacement axis can be coaxial with the follower rotational axis. But it is also possible for this single bearing point to be eccentric to the follower rotational axis. So, by way of example, a bearing arm, from which the bearing body protrudes, can be mounted on a point of the towing vehicle coupling eccentric to the follower rotational axis.

But it is also possible for the bearing body bearing the follower to be mounted movably on at least two, preferably at least three or four, bearing points on a component which is stationary with respect to the towing vehicle coupling in relation to the at least one degree of freedom of movement. By way of example, rotary bearings and/or sliding bearings can be provided at the bearing points. By way of example, the bearing points are provided in corner regions of polygons, in particular of a triangle or quadrangle, between which the bearing body is arranged.

The sensor is, by way of example, a magnetic sensor, a Hall sensor or similar. However, the sensor may also be an optical sensor, capacitive sensor, inductive sensor or similar. Combinations of different and/or physically differently detecting sensors are possible.

The follower can be mounted directly on the coupling element. By way of example, a bearing receptacle for the follower, in particular a bearing groove, is provided on the coupling element. It is possible for the coupling element to form the bearing body or for the follower to be mounted directly on the coupling element.

However, the follower can also be mounted on a coupling carrier, by way of example a coupling arm on which the coupling element is arranged. The coupling carrier then forms the bearing body or carries the bearing body.

However, it is preferred if the follower is mounted on a bearing body separate from the coupling element so that it is rotatable about the follower rotational axis or if the bearing body is separate from the coupling element. The bearing body is suitable, by way of example, for retrofitting a pre-existing trailer coupling or towing vehicle coupling.

The coupling element comprises, by way of example, a coupling ball, a coupling receptacle or similar or is formed thereof. By way of example, a trailer coupling of a trailer can be attached to the coupling ball or to another positive form-fitting element. The coupling receptacle, by way of example a coupling jaw, is suitable for receiving positive form-fitting elements of the trailer coupling of the trailer or a semitrailer, by way of example what is known as a king pin.

For supporting the follower with respect to the degree of freedom of movement which differs from the rotatability about the follower rotational axis, a bearing device is advantageously provided. The bearing device can, by way of example, movably support the bearing body, on which the follower is mounted so that it can rotate about the follower rotational axis. The bearing device is arranged, by way of example, stationary on the towing vehicle coupling. Bearing surfaces of the bearing device are advantageously always in contact with each other in the manner of bearing surfaces or contact surfaces of a sliding bearing or roller bearing.

The bearing device advantageously comprises at least one sliding bearing and/or one rotary bearing. A configuration is preferred in which a sliding bearing is integrated in a rotary bearing, i.e. by way of example, a sliding bearing element is slidably received in a pivot-bearing element, which in turn is pivotally mounted on a pivot bearing receptacle. The pivot bearing receptacle may be stationary with respect to the coupling element. But it is also possible that the sliding bearing element is stationary with respect to the coupling element and the rotary bearing receptacle is arranged on a body on which the follower is mounted so that it can rotate about the follower rotational axis, by way of example, a carrier of a holding device to be described in the following, the bearing body or similar.

A sliding bearing body of the bearing device is preferably fixed by means of an elastomeric body to a stationary component of the towing vehicle coupling, so that the sliding bearing body is deflectable in at least one direction transverse to its sliding axis with respect to the stationary component. The sliding bearing body comprises, by way of example, a bearing receptacle, a bearing axle body or similar, on which a further bearing body is mounted in a longitudinally displaceable manner with respect to the sliding axis. Thus, the sliding axle can tilt or pivot with respect to the stationary component of the towing vehicle coupling, preferably for tolerance compensation.

It is possible for the follower to be mounted on a coupling carrier or coupling arm, on which the coupling element is arranged. The coupling carrier has, by way of example, a bearing receptacle or another bearing contour for the follower. The coupling carrier thus forms the bearing body or carries the bearing body.

A preferred embodiment provides that the coupling element is a coupling ball and the coupling counter element is a coupling receptacle of a towing coupling of a trailer. The coupling element designed as a coupling ball expediently projects from a coupling arm or is arranged on a free end region of a coupling arm.

However, it is also possible for the sensor device to be arranged or arrangeable on what is known as a fifth-wheel coupling, in which the coupling element has a coupling receptacle, by way of example a coupling jaw for receiving a king pin of the coupling counter element. Thus, in this case, the receptacle is provided on the towing vehicle whereas the component engaging in the receptacle is present on the trailer vehicle.

The bearing body is suitably annular or has ring sections. The bearing body may by way of example be arranged on the outer circumference of a coupling arm or on the inner circumference of a coupling receptacle.

Furthermore, it is possible for the bearing body to have a recess or passage opening for at least one coupling element carrier of the towing vehicle coupling, by way of example the coupling arm. The bearing body can also be multi-part, that is to say that it has bearing body sections in order to support the follower. So consequently, the follower can be mounted on a plurality of bearing body parts or bearing body sections or a plurality of bearing bodies.

Furthermore, it is possible for the bearing body to comprise a bearing shaft or a bearing pin.

Also expedient is a holding device for holding the follower on an end face of the coupling counter element, in particular of the king pin. The holding device or a holding device can also be provided for attachment to opposite sides of the coupling receptacle. By way of example, the coupling receptacle is bounded by lateral sections of the coupling element. The holding device can be fixedly arranged or movably mounted on these lateral sections. By way of example, therefore, screws or other fastening means may be provided for securing the holding device to the coupling element.

It is possible for the holding device to have a holding body, in particular a holding plate, which extends below the receiving space or the coupling receptacle and, as it were, closes it from below in the manner of a lid.

The follower preferably has means for a frictional and/or non-positive and/or magnetically adhesive grip on the coupling counter element.

Advantageously, it is provided that the coupling counter element can pivot relative to the coupling element about the follower rotational axis through a pivoting angle of at least 140°, preferably 160° or more preferably at least 180° or at least 220°.

The at least one degree of freedom of movement of the follower for providing or maintaining the follower coupling to the coupling counter element expediently comprises at least one rotational degree of freedom for rotation of the follower about at least one rotational axis angled, by way of example at right angles, to the carrier rotational axis, or is formed thereof. It is preferred if there are two rotational degrees of freedom that are different from the follower rotational degree of freedom and serve as degrees of freedom of movement for providing or maintaining the follower coupling of the follower to the coupling counter element.

By way of example, the follower may be gimbal-mounted with respect to the coupling element or on the coupling element. However, the cardan axes or gimbal axes are different from the follower rotational axis. By way of example, the follower is mounted on the bearing body so that it can rotate about the follower rotational axis, which in turn is gimbal-mounted with respect to the coupling element.

It is also advantageous if the follower or the bearing body, which rotatably supports the follower with respect to the follower rotational axis, is supported by at least one ball joint with respect to the coupling element or on the coupling element.

The ball joint is preferably rotationally fixed against rotation with respect to the follower rotational axis on the coupling element or with respect to the coupling element.

But it is also possible that the ball joint is not freely movable with respect to the follower rotational axis and with respect to the coupling element, but by way of example is braked, by way of example by a friction brake or similar.

The follower is advantageously mounted so that it is movable with respect to the coupling element for providing or maintaining the follower coupling to the coupling counter element with at least one rotational degree of freedom different from the rotatability about the follower axis, allowing the deflection of the follower with respect to the coupling element by a minimum of 3° or a minimum of 5° or at least 10° from a central position of the follower with respect to the coupling element and/or a displacement of the follower with respect to the coupling element of a maximum of 30°, advantageously a maximum of 20° or a maximum of 10° from a central position of the follower with respect to the coupling element. The follower can be deflected from the central position with respect to the rotational axis different from the follower rotational axis, which may also be referred to as a pivot axis, to opposite sides by a maximum of 30°, in particular not more than 20° or not more than 10°. A deflection of the follower of more than this from the middle position is advantageously not necessary and/or not provided for.

A maximum total deflection ability of the follower about a rotational axis/pivot axis which is angled relative to the follower rotational axis is, by way of example, a maximum of 60°, a maximum of 40° or a maximum of 20°.

Preferably, it is provided that the follower is mounted such that it can displace with respect to the coupling element about at least one displacement axis or linear axis, by way of example about a linear axis or displacement axis, which is coaxial or parallel to the follower rotational axis.

Preferably, the follower is arranged linearly immovably, but rotatable about the follower rotational axis, with respect to the bearing body, in particular with respect to the follower rotational axis. The linear immovability may be provided with respect to one or more axes, in particular one or more rotational axes.

Advantageously, it can be provided that the follower is mounted on the bearing body so that it rotates exclusively about the follower rotational axis, but otherwise has no degree of freedom of movement with respect to the bearing body.

Advantageously, it is provided that the follower is mounted exclusively rotatably on the bearing body.

The bearing body, however, can be mounted so that it is linearly displaceable relative to the coupling element, in particular parallel to the follower rotational axis. Thus, a linear displaceability of the follower relative to the coupling counter element is provided by the linear displaceability or a linear displaceability of the bearing body relative to the coupling element. The linear displaceability of the follower parallel to the follower rotational axis is preferably the only linear displaceability of the follower relative to the coupling element. The follower is otherwise not linearly displaceable, but is preferably rotatable through at least one rotational degree of freedom, which is different from a rotation about the follower rotational axis.

The sensor device expediently comprises a holding device for holding the bearing body against rotation with respect to the follower rotational axis of the bearing body on the coupling element. The bearing body itself is thus held in rotation with respect to the coupling element by the holding device. In turn, the follower is mounted on the bearing body so that it can move about the follower rotational axis.

The sensor device is expediently fastened to the towing vehicle coupling by means of a fastening means. The fastening means comprises, by way of example, a screw means, a clamping means, a form-fitting contour or similar. Adhesion and/or welding as fastening means for fastening the sensor device to the towing vehicle coupling are also advantageous. Gluing and welding have the advantage that the structure of the towing vehicle coupling remains unchanged, by way of example, no holes or similar are necessary. For producing a welded joint between the Sensor device and the towing vehicle coupling capacitor discharge welding is, by way of example, suitable.

Furthermore, the sensor device can be connected to the ball coupling on the basis of at least one rivet. Weiterhin können sogenannte Schweißbolzen, jedenfalls mindestens ein Schweißbolzen, eingesetzt werden, d. h. Bolzen, mit denen eine Komponente davon mit der Zugfahrzeugkupplung verschweißt sind.

Finally, a suction means, by way of example a suction head, is also suitable as a means of fastening. A suction head may for example be arranged, and/or provided, on the holding device and designed to suck the holding device onto a coupling arm or a surface next to a coupling receptacle of the towing vehicle coupling.

The holding device expediently comprises the abovementioned or a fastening means, by way of example a screw means, clamping means, a form-fitting contour or similar, for attachment to the coupling element or to the coupling element of the towing vehicle coupling. As a screw means, by way of example, one or more screws are provided. A clamping by means, by way of example, of clamping contours, a clamping projection or similar is also advantageous for attaching the holding device to the coupling element or adjacent to the coupling element of the towing vehicle coupling. But gluing may also serve as a means of attachment. A suitable form-fitting contour, by way of example, a support projection, a hook contour or similar, with which the holding device is to be positively secured to the towing vehicle coupling is suitable.

The holding device can serve to support the bearing body with at least one degree of freedom of movement suitable for providing or maintaining the follower coupling of the follower to the coupling counter element, which differs from the rotatability about the follower rotational axis, with respect to the coupling element. By way of example, the holding device is gimbal-mounted with respect to the coupling element.

The holding device can, by way of example, form a bearing device for the bearing body, on which the follower is mounted rotatably about the follower rotational axis.

The holding device has, by way of example, a carrier, in particular a support plate, for the bearing body.

It is possible for the carrier to be releasably connected to the coupling element or a component of the towing vehicle coupling carrying the coupling element by means of said fastening means and/or a fastening device. The fastening device comprises, by way of example, a screw arrangement with one or more screws and/or a latching arrangement and/or a clamping arrangement or similar.

The carrier may be fixed or stationary with respect to the coupling element.

The carrier is expediently movably mounted on the coupling element or with respect to the coupling element.

In particular, in this case, it is possible for the bearing body itself to be firmly connected to the carrier, i.e. for the mobility of the bearing body through one or more degrees of freedom that are different from the rotatability about the follower rotational axis, to be exclusively or substantially provided by the holding device.

Furthermore, however, it is also possible for the bearing body to be movably mounted on the support with at least one degree of freedom of movement which differs from the rotatability about the follower rotational axis. In this case, the carrier may even be firmly connected to the coupling element of the towing vehicle coupling or to the coupling element of the towing vehicle coupling, whereas the mobility of the follower, apart from the follower rotational axis, is provided by a movable mounting of the bearing body on the carrier of the holding device.

It is preferred if the bearing body is mounted so as to be able to float with respect to the coupling element of the towing vehicle coupling, with the exception of a rotatability about the follower rotational axis, and/or with at least two degrees of freedom of movement. So, by way of example, the bearing body may be mounted to move about two mutually different pivot axes with respect to the coupling element, which differ from the follower rotational axis, in particular being angled to this.

An advantageous embodiment of the invention or also an independent invention in connection with the features of the preamble of claim 1 is represented by the following measure.

On the bearing body, the follower is advantageously rotatably mounted on at least two rotary bearings, by way of example rolling bearings, in particular roller bearings, ball bearings or similar, between which there is a spacing with respect to the follower rotational axis. In the gap, by way of example, the at least one sensor or a sensor device can be arranged. The bearing concept with spaced rotary bearings enables optimal support of the follower on the bearing body. A tilting or other unfavourable position of the follower relative to the bearing body can be avoided or reduced by the two mutually spaced rotary bearings. As a result, the follower runs particularly easily relative to the bearing body.

Furthermore, it is advantageous for the follower to be rotatably mounted on mutually opposite longitudinal end regions of the bearing body with respect to the follower rotational axis. By way of example, the follower is mounted on a free longitudinal end region as well as on a foot region of the bearing body with which it is connected to a further body, in particular the holding device or a holding device as mentioned above.

Even if only a single rotary bearing, but also if two or more rotary bearings is or are present between bearing body and follower, it is advantageous if the or all rotary bearings between bearing body and follower is or are designed as rolling bearings, in particular roller bearings, ball bearings, needle roller bearings or similar. As a result, the follower rotates particularly easily with respect to the bearing body, so that the following by the coupling counter element is easier to achieve.

The follower expediently has an end face penetrated by the follower rotational axis, which is configured and/or provided for following by the coupling counter element. The end face is, by way of example, a frictional engagement surface, a surface with form-fitting contours or similar. Thus, the end face serves for frictional or positive following by the coupling counter element. However, the end face is also suitable for optimum following if magnetic adhesion is provided and/or if the follower is loaded by a spring arrangement in the direction of a following contact with the coupling counter element, which will become clearer subsequently.

The end face is expediently designed as a plane surface or has a plane surface.

An end face of the follower traversed by the follower rotational axis expediently has at least one ring or is formed by a ring. Needless to say, on the front face on the one hand an end face, on the other hand also a ring, may be present which, by way of example, engages with an outer periphery of the coupling counter element or can come into contact with its front side with an outer periphery of the coupling counter element. The ring can be designed, so to speak, as an annular projection in front of an end face, which is also provided for frictional, form-fitting or other follower coupling with the coupling counter element.

The follower advantageously has at least one inclined surface, in particular an insertion bevel, a conical surface or similar, along which the coupling counter element can slide when coupling to the towing vehicle coupling. Such an inclined surface can, by way of example, be configured or provided as a conical inclined surface between on the one hand the aforementioned end face or plane surface and on the other hand an outer circumference of the follower.

The sensor device preferably has a force-applying means or a plurality of force-applying means for applying a force to the follower in the direction of the coupling counter element. So, therefore, the follower is subjected to force towards the coupling counter element, which facilitates or improves the follower coupling.

Preferably, the sensor device has a spring arrangement for providing a spring force acting on the follower in the direction of the coupling counter element. The spring arrangement may comprise one or more springs, in particular metallic springs, helical springs, coil springs or similar.

However, the spring force can also be provided or supported in whole or in part by a certain elasticity of a follower body of the follower. A combination of springs sperate from the follower, in particular metallic springs, spring buffers or similar, with an elastic or spring-elastic follower body of the follower is easily possible.

At this point it should be mentioned that the follower advantageously has at least one elastic section for elastic deformation by the coupling counter element. So, by way of example, the force can be applied by a spring, a magnet or similar in the direction of the coupling counter element. The elastic section then yields. The follower is therefore advantageously elastically deformable or at least partially elastically deformable by the coupling counter element.

Furthermore, it is advantageous if the sensor device has a magnet arrangement for providing a magnetic force of attraction acting on the follower in the direction of the coupling counter element. The magnet arrangement may comprise one or more magnets which cooperate, by way of example, with the in itself ferromagnetic coupling counter element.

The magnet arrangement may comprise permanent magnets and/or electromagnetically acting magnets. By way of example, the magnet arrangement comprises one or more electrical coils.

The magnet arrangement may have one or more flux-conducting elements for guiding the magnetic flux which a permanent magnet or electromagnet of the magnet arrangement generates. By way of example, such a flux conducting element, in particular a soft magnetic flux conducting element, is configured and provided for directing or guiding the magnetic flux in the direction of the coupling counter element. The flux guide element is suitable, by way of example, for reinforcing or aligning a force of attraction of the follower in the direction of the coupling counter element.

The magnet arrangement can be configured or arranged for the actuation and excitation of the at least one sensor. So, therefore, the magnet arrangement is used twice, as it were, namely for the generation of the force of attraction in the direction of the coupling counter element, but also for the excitation or actuation of the at least one sensor.

Furthermore, however, it is also possible for the magnet arrangement to have a screening device for screening the at least one sensor from magnetic influences of the magnet arrangement. So, by way of example, the magnetic field of the magnet arrangement can be directed away from the sensor or around the sensor. It should be mentioned at this point that a combination of magnetic screening and magnetic actuation of the sensor is also possible. By way of example, conduction of the magnetic flux or magnetic field of the magnet assembly may occur around a section of the sensor at another point in order to avoid faulty actuation while still directing the magnetic field toward the sensor.

On the follower at least one frictional engagement surface for a frictional contact with the coupling counter element and/or at least a form-fitting contour for a positive engagement of the coupling counter element and the follower one inside the other is expediently provided or arranged. The frictional engagement surface may include, by way of example, a rubber surface or similar.

The follower may have a follower ring or annular section. Several part-rings, which are coupled or connected together, may also be present in the follower. An annular or partially annular circumferential follower contour in the follower is also advantageous.

The follower expediently has a coupling-shaped or tower-like with follower body. The follower body can be configured by way of example in the manner of a hood or a cover.

The follower expediently forms a protective housing or a cover for the at least one sensor.

It is also advantageous if the follower forms a protective housing for a bearing body supporting the follower, such as a bearing shaft or similar.

Also advantageous is a multi-part, in particular two-part, configuration of the follower:

It is preferred if the follower has a follower carrier on which a follower body is releasably secured. The at least one frictional engagement surface or an arrangement of a plurality of frictional engagement surfaces with particles is provided on the follower body. The follower carrier is rotatably mounted, by way of example, on the coupling element, the bearing element separate from the coupling element or similar. The follower body itself is the wear part, which can be replaced if necessary. Even if the sensor device should be inactive, as it were, this solution offers advantages. It is namely possible to remove the follower body from the follower carrier, so that the follower carrier cannot have a follower contact with the coupling counter element.

The follower carrier forms, so to speak, the rotatably mounted component, while the follower body is attached in another way to the follower carrier, by way of example, latched, glued, clipped, screwed or similar.

The follower, in particular the follower carrier, can by way of example form a protective housing for the at least one sensor and/or an evaluation device of the sensor.

The follower, in particular the follower body, expediently has a slide-on slope for sliding on the coupling counter element. Thus, the coupling counter element cannot damage the follower body when coupling the coupling counter element to the coupling element or easily come into follower contact with the follower body. The slide-on slope for the coupling counter element is preferably provided on an edge region of the follower body.

The follower body can surround the follower carrier ring. This variant is particularly advantageous if the follower body, in particular a coupling ball, is arranged directly on the coupling element.

It is also advantageous if the follower body forms a cap or a lid for the follower carrier. By way of example, the frictional engagement surfaces are then arranged on the front side and/or radially outward on the follower body.

It is advantageous if the follower body projects in the manner of a mushroom or similar from the follower carrier. By way of example, it is preferred if the follower body projects transversely to the follower rotational axis from the follower carrier.

The at least one sensor and/or a bearing body which supports the follower around the follower rotational axis, by way of example a bearing shaft, is preferably arranged, in particular completely arranged, in an interior space of the follower. But a partial arrangement of the at least one sensor or the bearing body in the interior of the follower is also possible. Thus, by way of example, the follower can overlap an end region of the bearing body, in particular a bearing shaft. The at least one sensor and/or the bearing body are arranged, by way of example, below an end wall or ceiling wall and in a wall of the follower interior delimited by a peripheral wall.

The sensor device expediently comprises at least one sensor or sensor transmitter mounted rotatably about the follower rotational axis, in particular a ring comprising an arrangement of a plurality of sensors or sensor transmitters. The rotatably mounted sensor or sensor transmitter is rotatably coupled or rotationally connected to the follower. Therefore, when the follower rotates about the follower rotational axis, it carries with it the at least one sensor or sensor transmitter.

It is also advantageous if the sensor device has a ring arrangement of a plurality of sensors or sensor transmitters arranged about the follower rotational axis. A "counterpart" to the respective sensor or sensor transmitter, that is to say a sensor transmitter for the sensor and a sensor for the sensor transmitter, is expediently arranged in a stationary manner with respect to the follower rotational axis. By means of the ring arrangement of a plurality of sensors, or sensor transmitters, which are rotatable in particular about the follower rotational axis, an optimum resolution of the angle signal, generated by the sensor device when the follower rotates about the follower rotational axis, is possible.

The joint rotational axis, which corresponds to the follower rotational axis, is expediently a vertical axis and/or a substantially vertical rotational axis.

It is possible for the joint rotational axis and the follower rotational axis to be coaxial and/or aligned with one another when the coupling element and the coupling counter element are coupled to one another.

But a transverse distance between these two rotational axes is also possible. It is at least advantageous if the joint rotational axis and the follower rotational axis run parallel to each other, when the coupling element and the coupling counter element are coupled to each other.

An advantage of the invention is if or that the sensor device is arranged on the towing vehicle, while the trailer vehicle forms, so to speak, the passive device but which actuates the sensor device. The trailer vehicle does not need to be modified.

The sensor device may be provided for retrofitting towing vehicles, i.e. in that the towing vehicle coupling is to be retrofitted with the sensor device, e.g. by gluing, welding, clamping or similar.

Furthermore, it is possible that the towing vehicle coupling and/or the coupling of the trailer vehicle, which has the coupling counter element, is not or does not need to be changed mechanically. In particular, components of the towing vehicle coupling and the coupling of the trailer vehicle provided in the power flow or for power transmission between towing vehicle and trailer vehicle remain unchanged, by way of example the areas of the coupling element and the coupling counter element which engage in one another and form the joint, and/or a locking device of the towing vehicle coupling or coupling of the trailer or similar.

It is advantageously provided that a locking technology or locking device of the towing vehicle coupling or the coupling of the trailer vehicle does not have to be modified.

Figure 4:
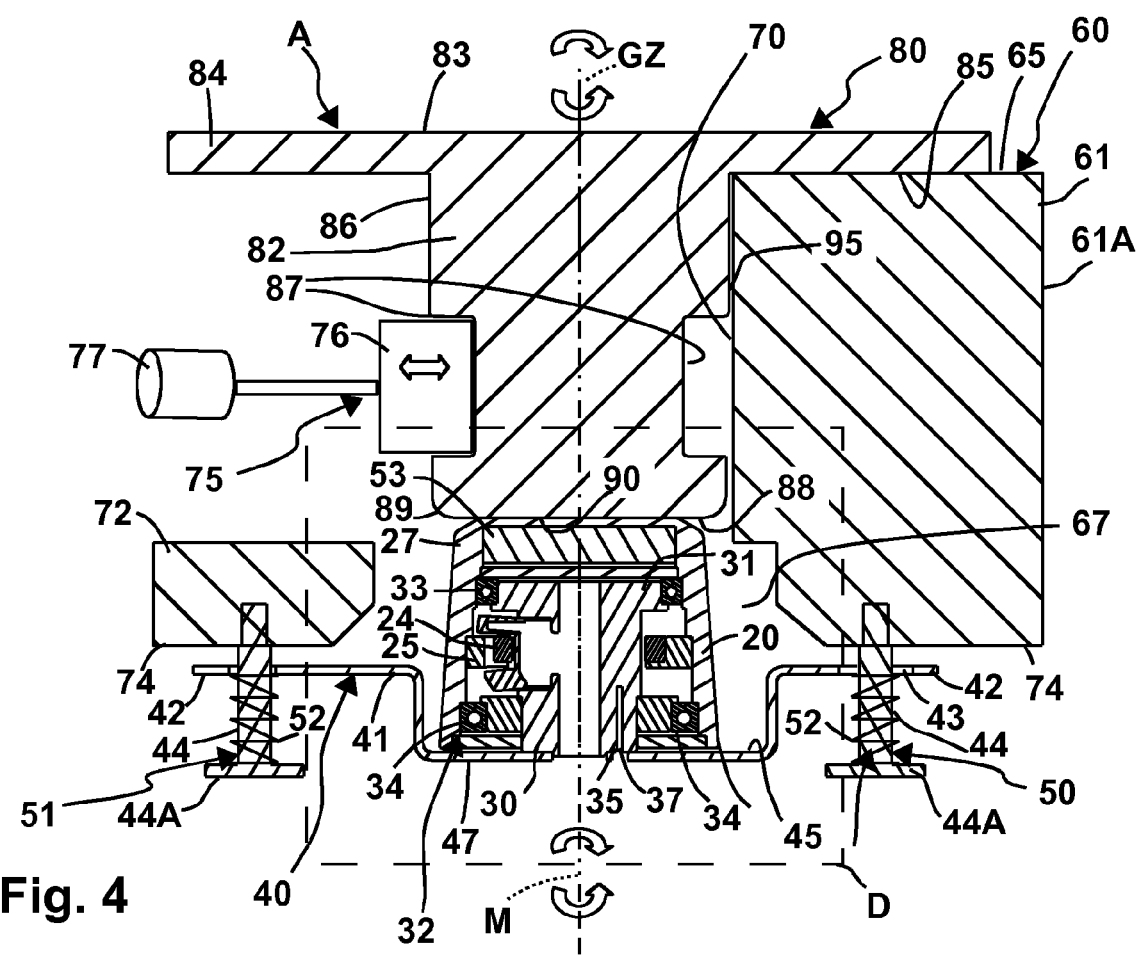
Figure 2:
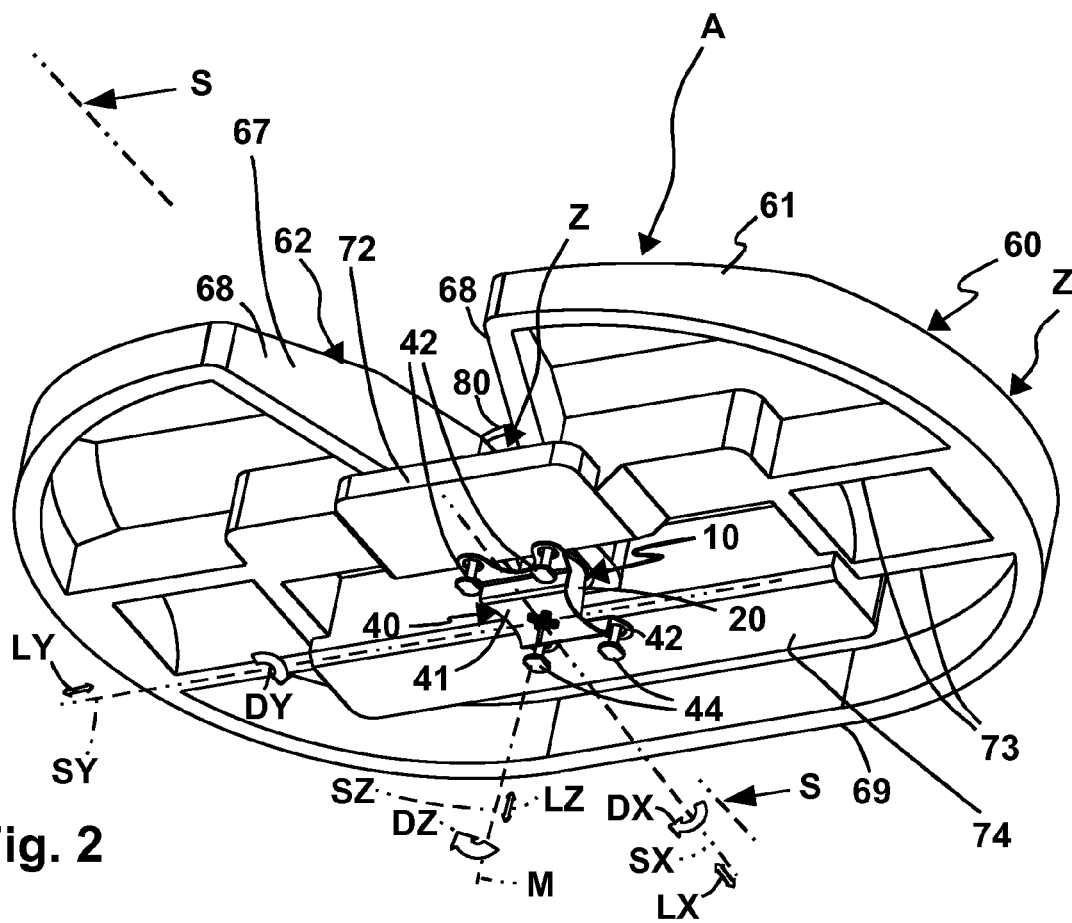
Figure 3:
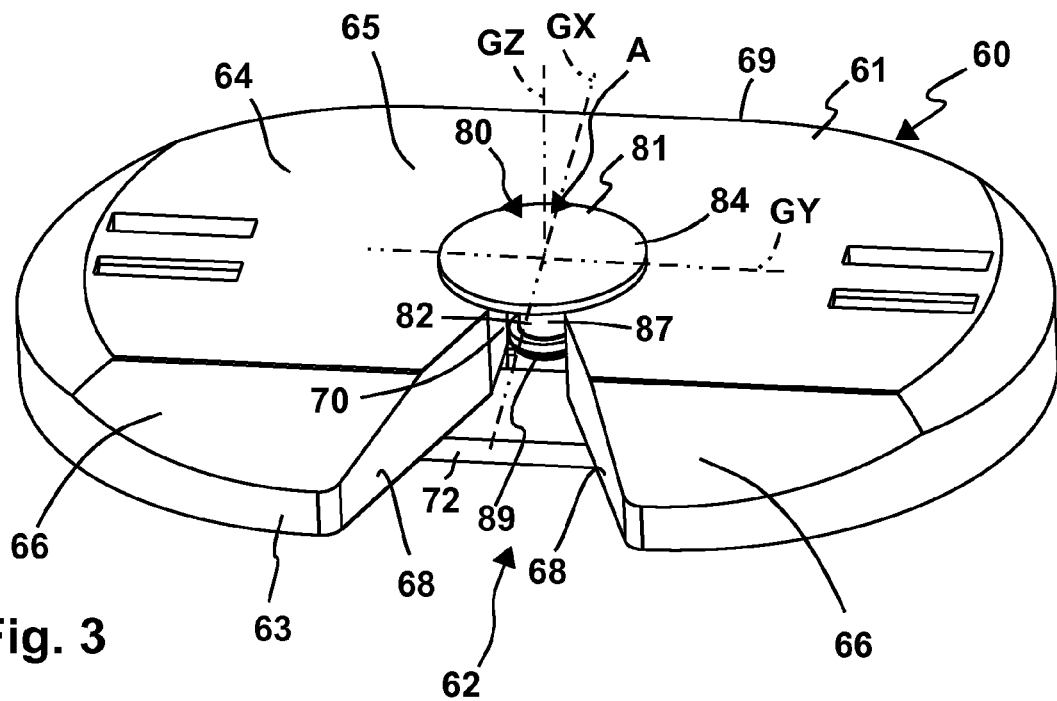
Figure 5:
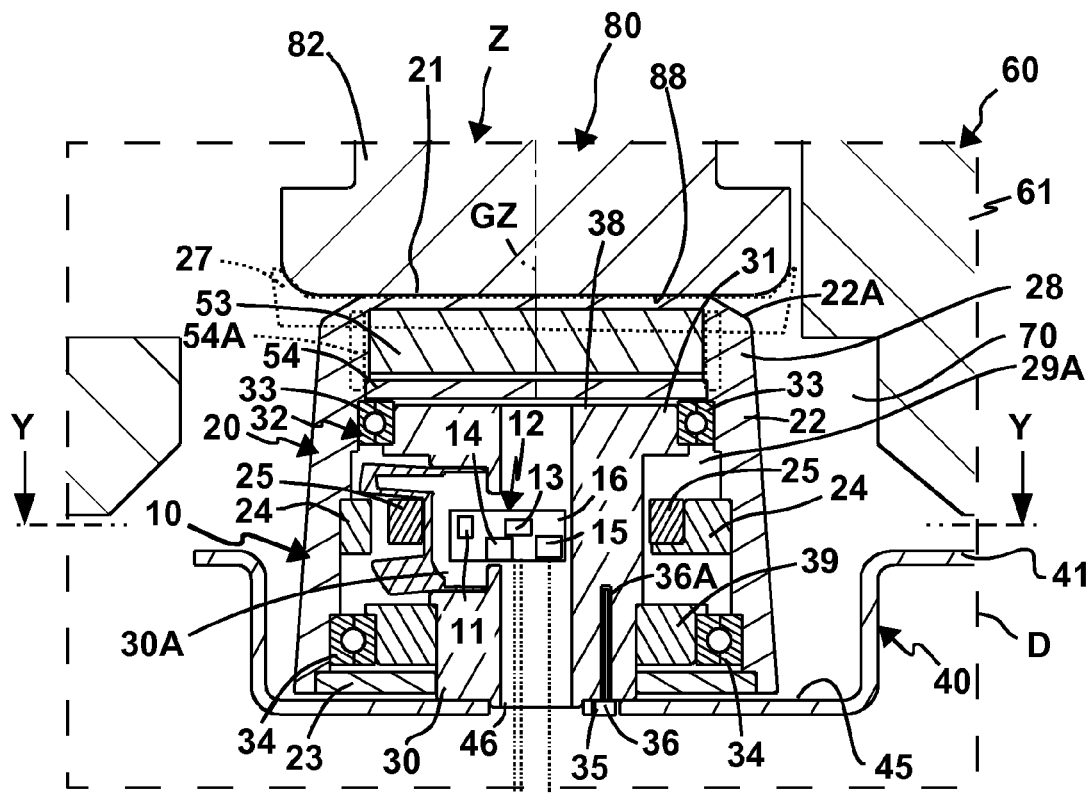
Figure 6:
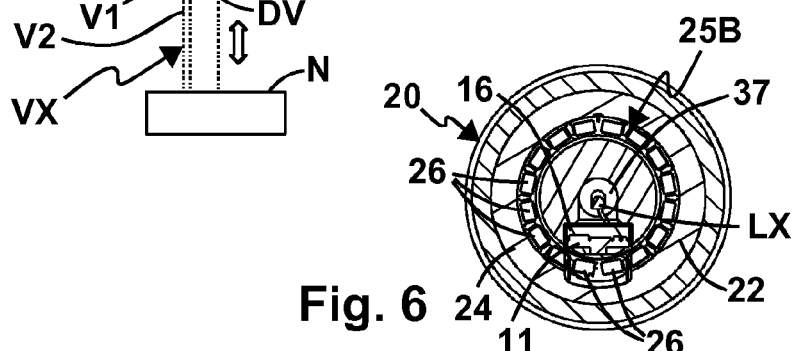
Figure 7:
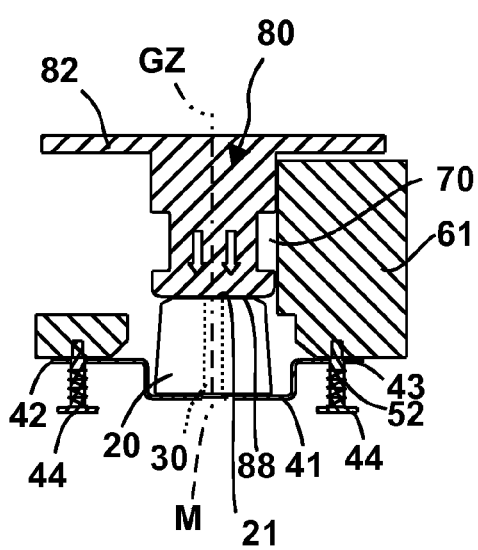
Figure 8:
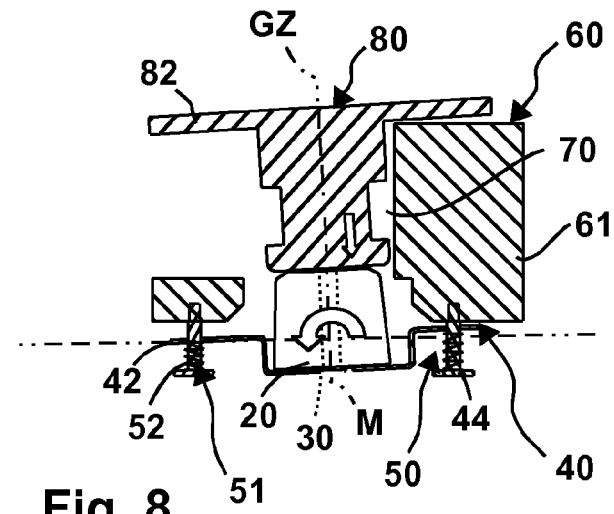
Figure 9:
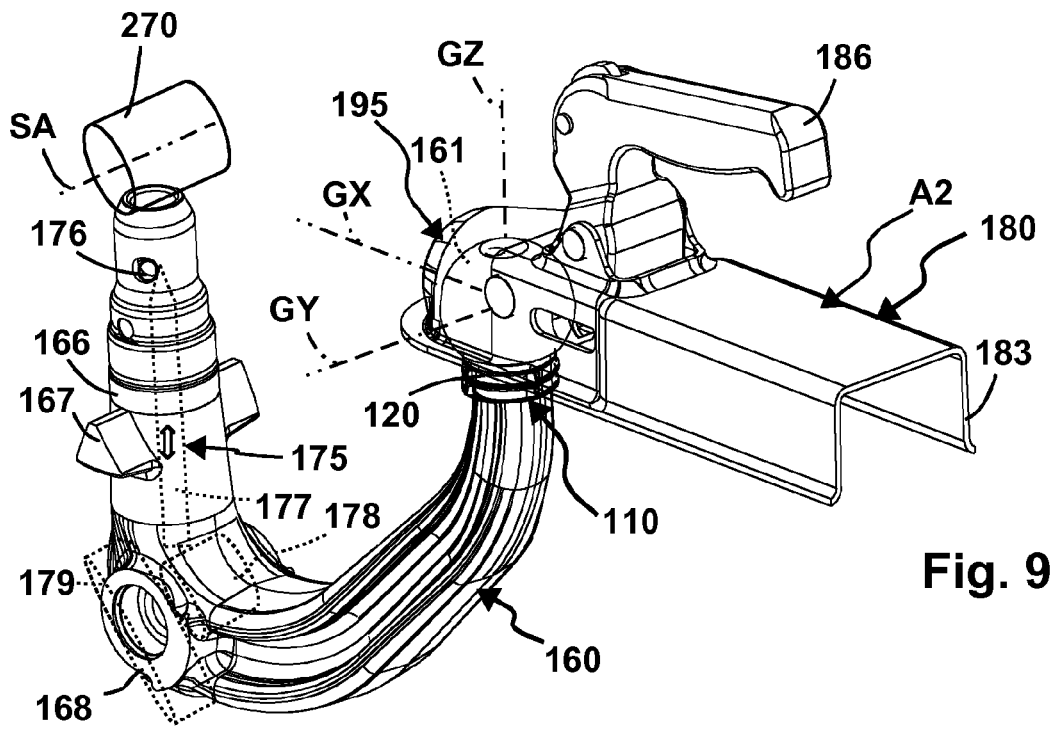
Figure 10:
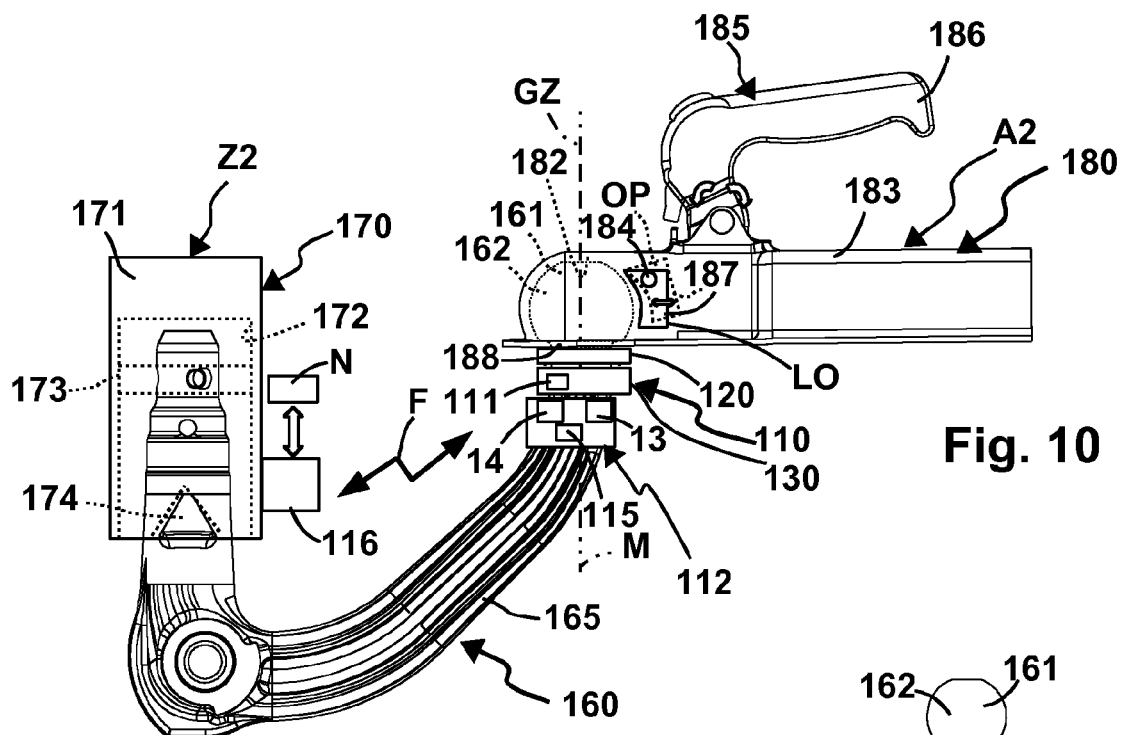
Figure 11:
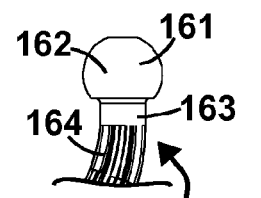
Figure 17:
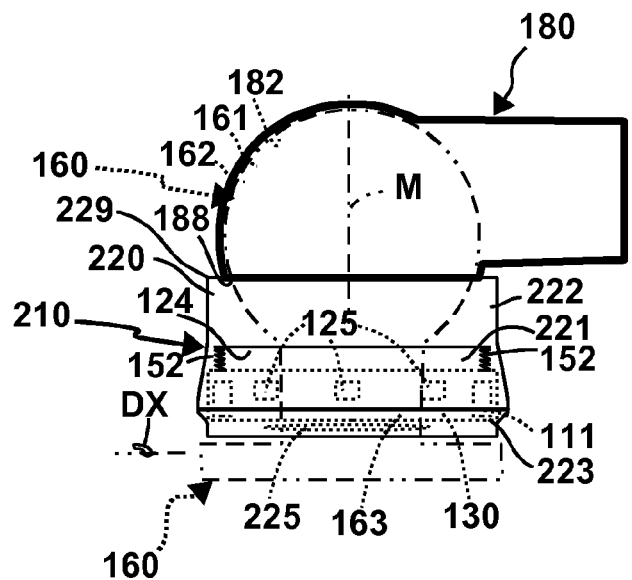
Figure 18:
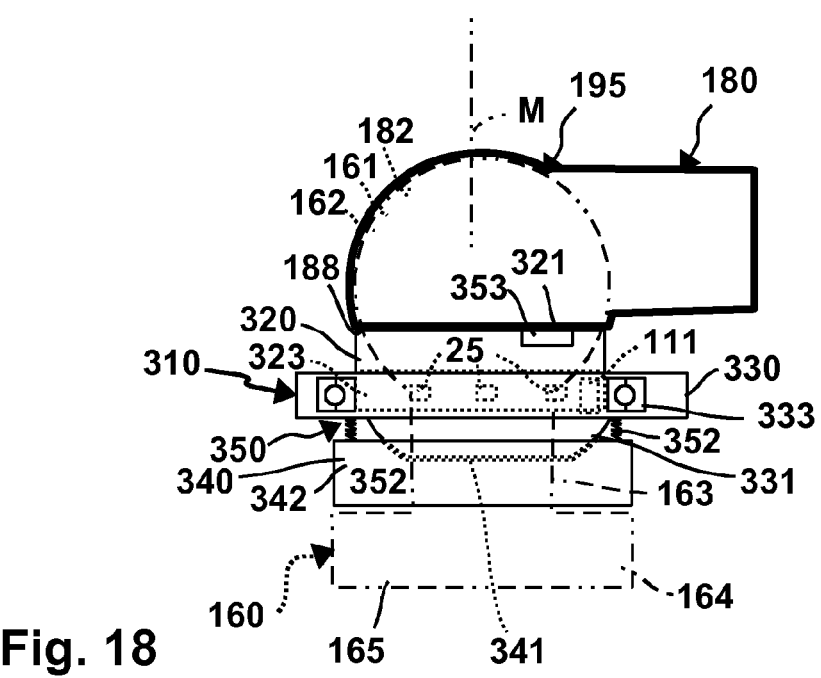
Figure 19:
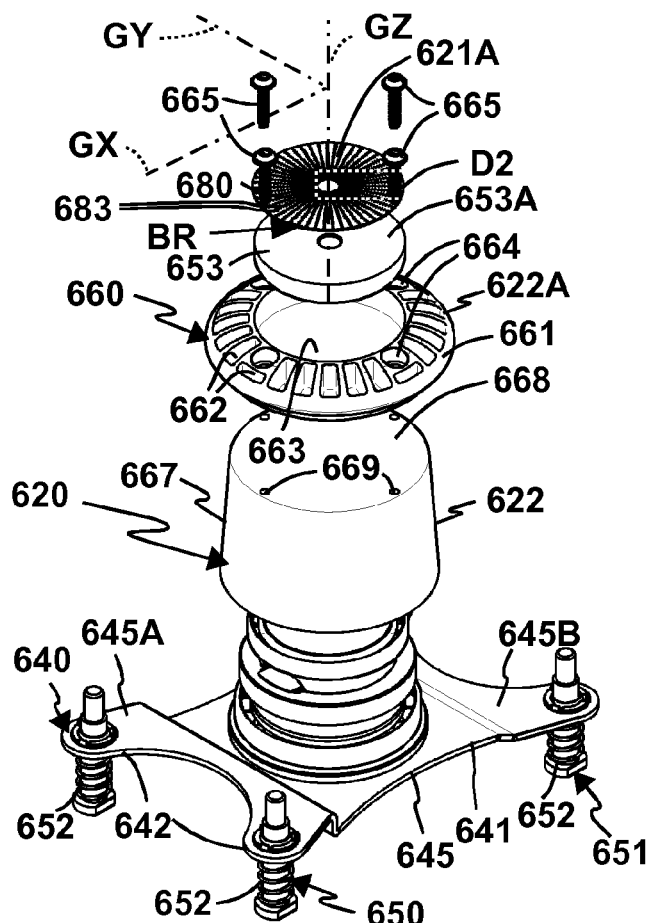
Figure 20:
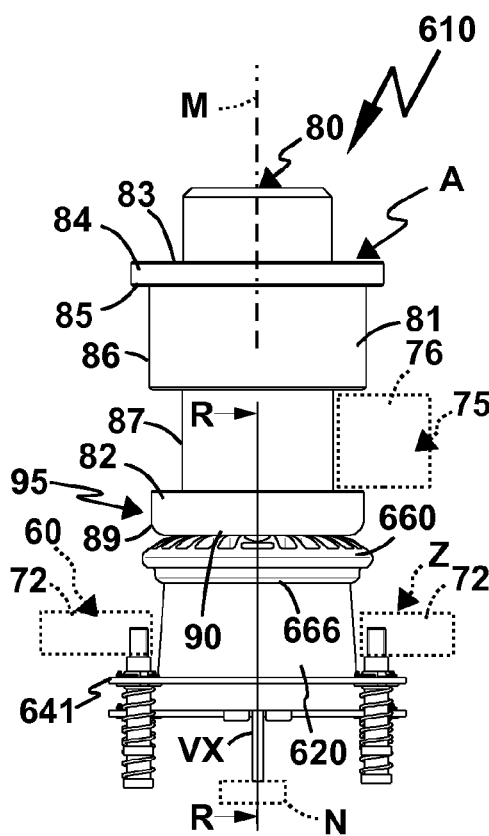
Figure 21:
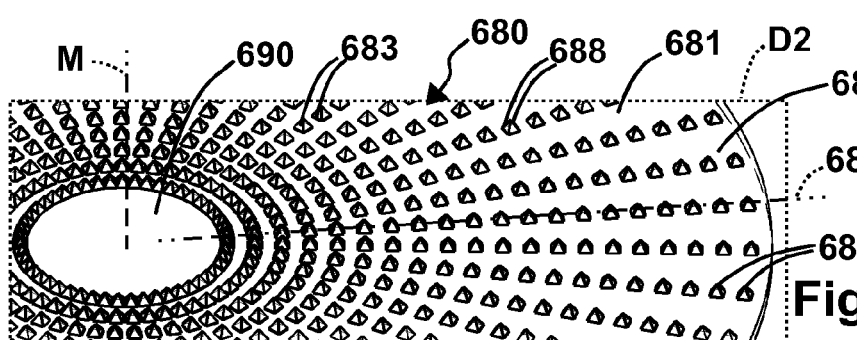
Figure 22:
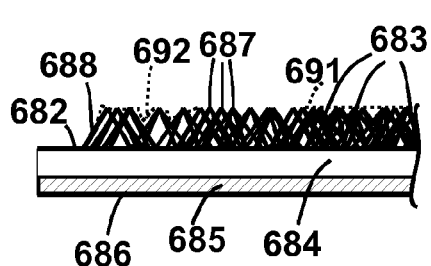
Figure 26:
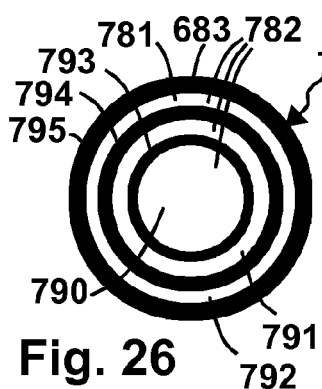
Figure 27:
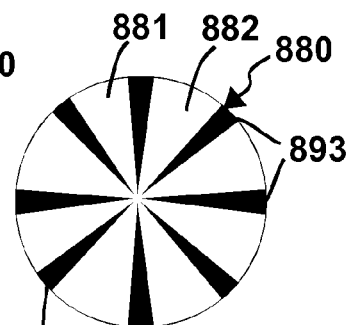
Figure 24:
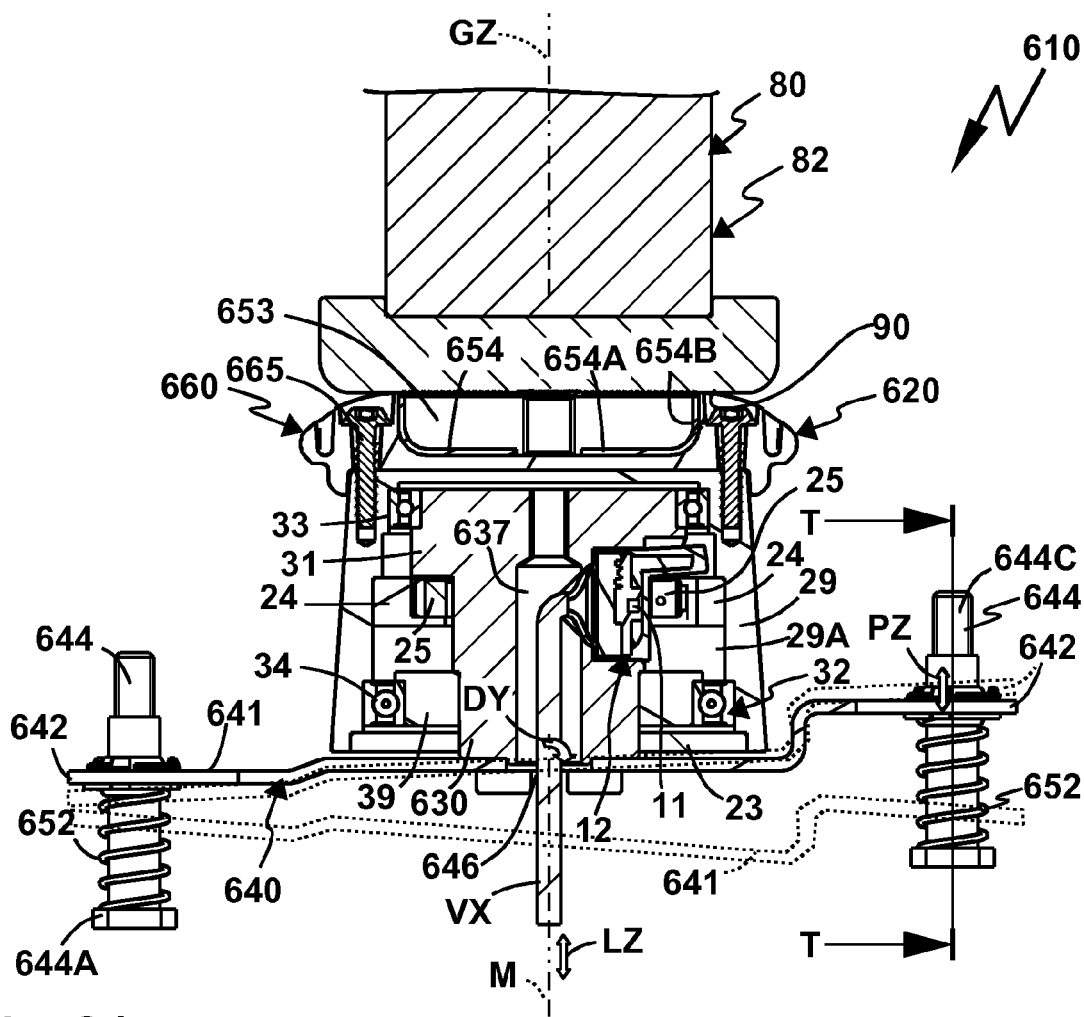
Figure 23:
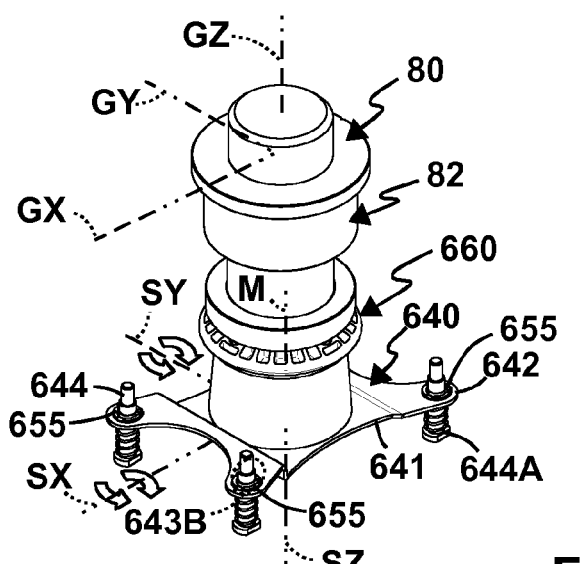
Figure 25:
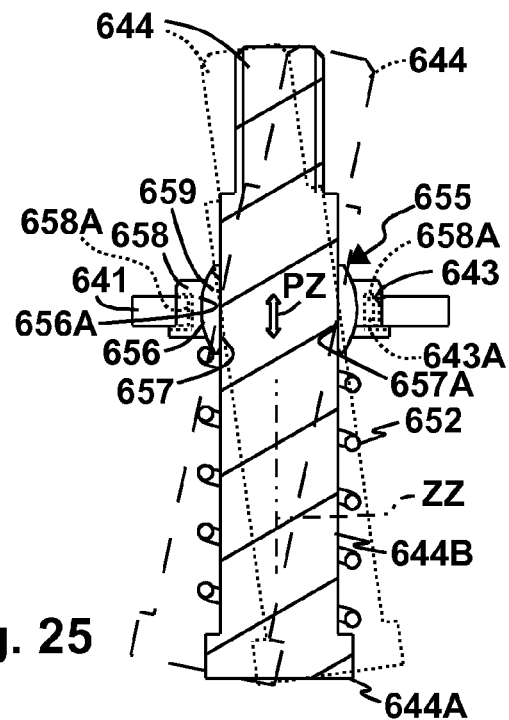
Figure 28:
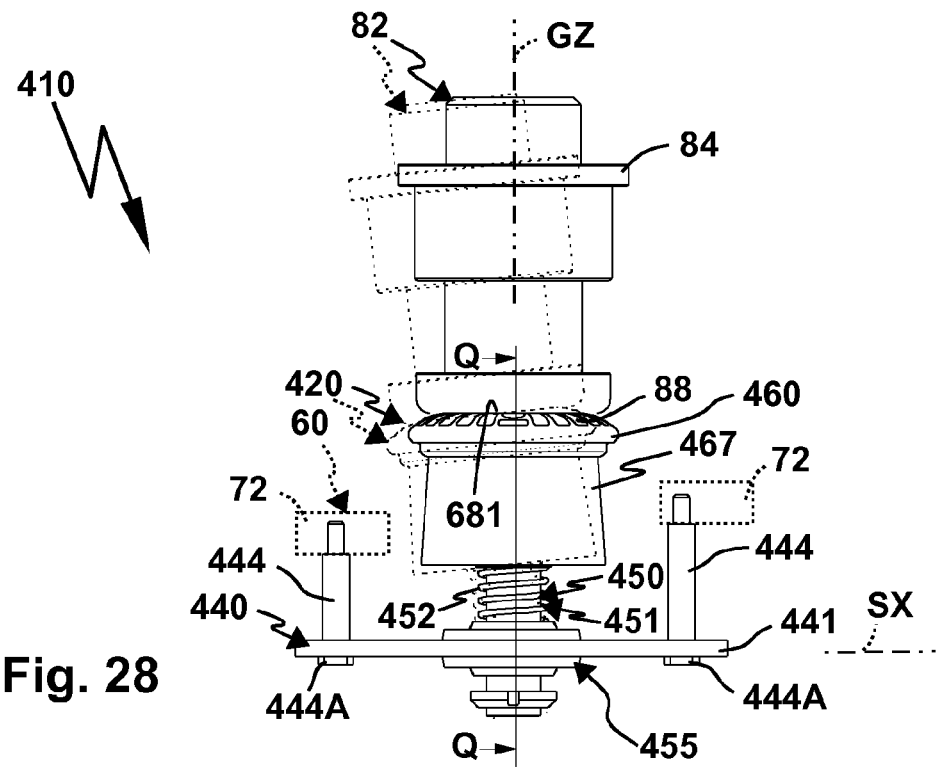
Figure 29:
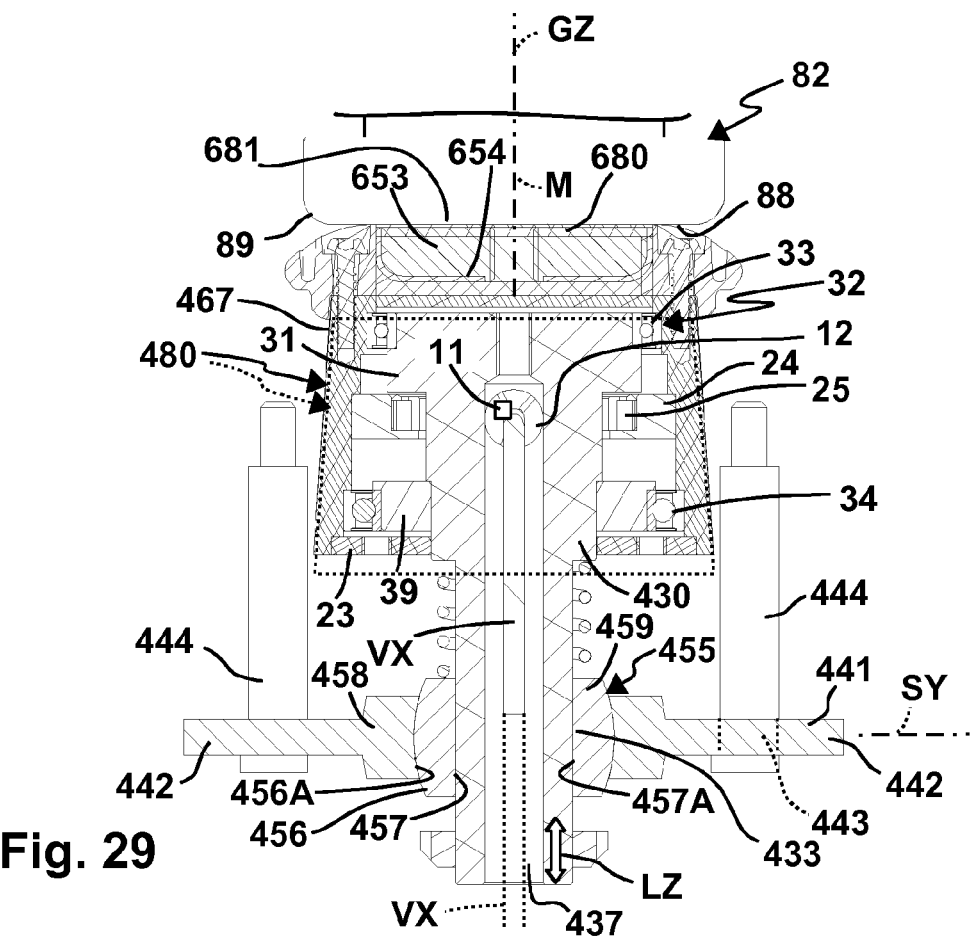
Figure 32:
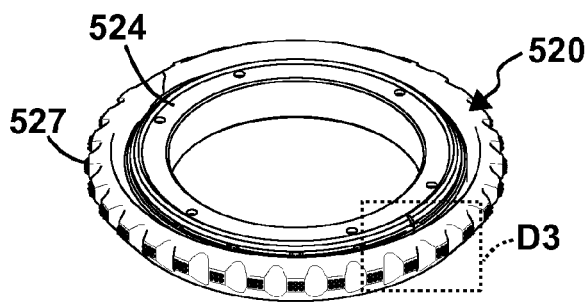
Figure 33:
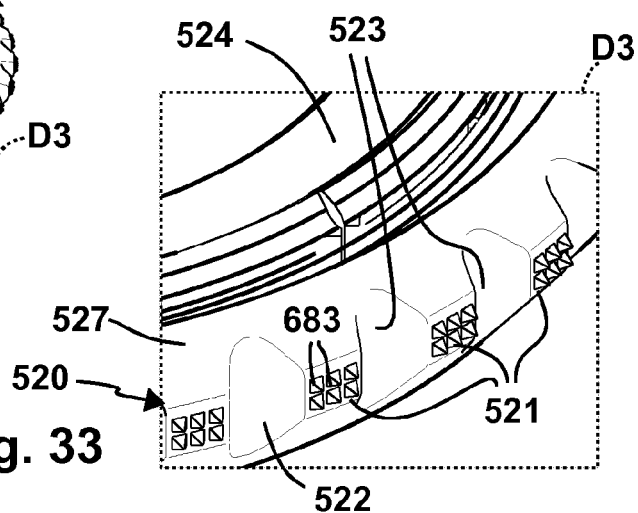
Figure 31:
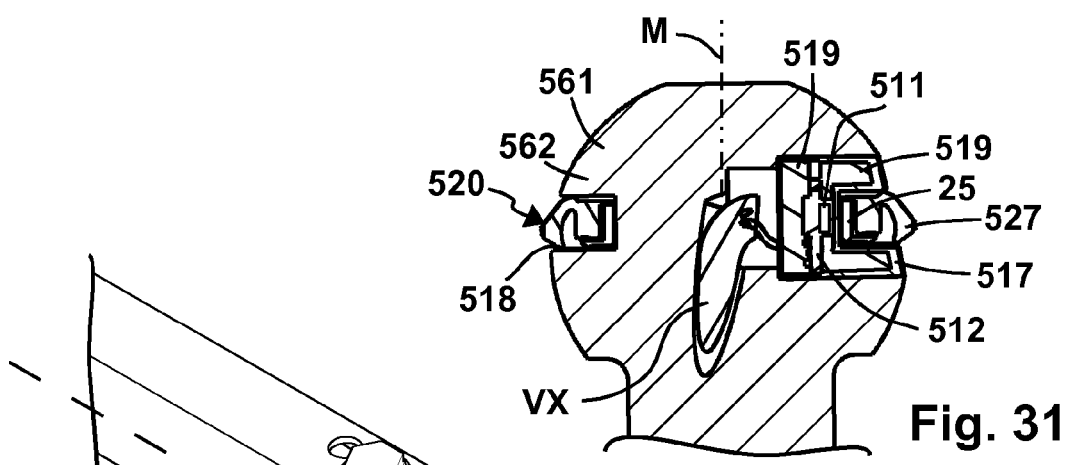
Figure 30:
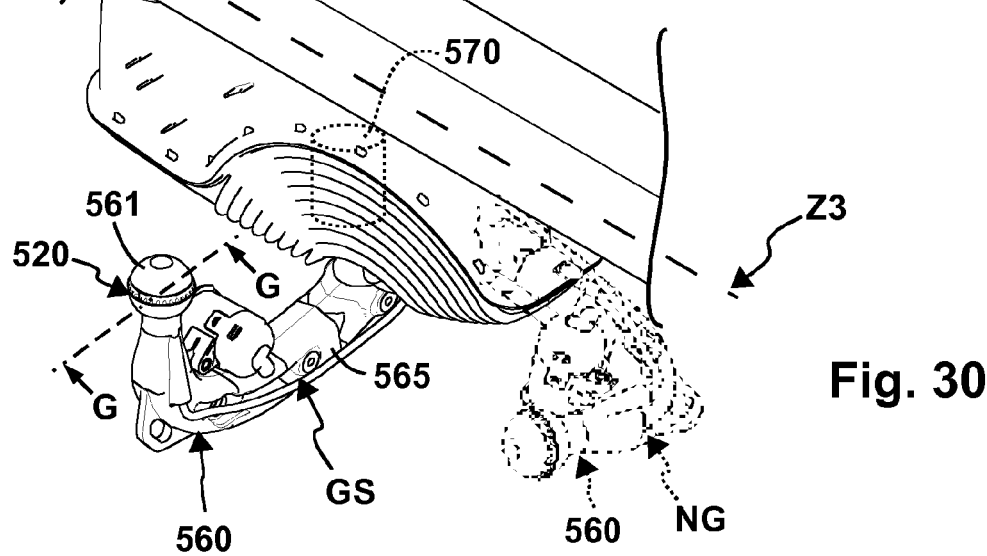

Embodiments of the invention are explained below using the drawings. In which:

FIG. 1 is a perspective oblique view of a towing vehicle coupling and a sensor device together with a trailer coupling that can be coupled thereto, FIG. 2 is a perspective oblique view of the towing vehicle coupling of FIG. 1 from below, FIG. 3 is a perspective oblique view of the towing vehicle coupling of FIG. 1 obliquely from above, wherein the trailer coupling is coupled to the vehicle coupling, FIG. 4 is a cross-sectional view through the arrangement of FIG. 2 approximately along a line of intersection S-S, FIG. 5 is a detail D from FIG. 4, FIG. 6 is a sectional view through a follower of the sensor device shown in FIG. 5, approximately along the line of intersection Y-Y, FIG. 7 is the arrangement of FIG. 4 in a cross-sectional view during coupling of the trailer coupling to the towing vehicle coupling, FIG. 8 is the arrangement of FIG. 7, wherein the trailer coupling is pivoted about a joint rotational axis relative to the towing vehicle coupling, FIG. 9 is a perspective view of another embodiment of a towing vehicle coupling configured as a ball coupling and coupled to a trailer coupling designed as a ball coupling, FIG. 10 is the arrangement of FIG. 9 from the side, FIG. 11 is a longitudinal end region of a coupling element of the towing vehicle coupling of FIGS. 9, 10, FIG. 12 is the towing vehicle coupling and the trailer coupling of FIG. 9 before the coupling of the two components, FIG. 13 is a side view of the arrangement of FIG. 10 with a detailed representation of a sensor device, FIG. 14 is the arrangement of FIGS. 9 and 10, wherein the trailer coupling is pivoted relative to the towing vehicle coupling about a joint pivot axis, FIG. 15 is a schematic representation of the coupling combination according to FIGS. 12-14 with a sensor device shown in more detail, FIG. 16 is the arrangement of FIG. 15, wherein the trailer coupling is pivoted through a pivot angle relative to the towing vehicle coupling, FIG. 17 is an exemplary embodiment of a sensor device arranged below a coupling ball and includes a protective housing, FIG. 18 is an exemplary embodiment of a sensor device, with a bearing body supported by a ball joint, FIG. 19 is a sensor device in exploded view, which can be arranged on the towing vehicle coupling of FIG. 1 as an alternative to the sensor device of FIG. 1, FIG. 20 is a side view of the arrangement of FIG. 19 in cooperation with the trailer coupling, FIG. 21 is a detail D2 from FIG. 19, FIG. 22 is a partial side view of a follower of the sensor device of FIG. 19, approximately in a line of sight BR, FIG. 23 is a perspective view from above of the arrangement of FIG. 20, FIG. 24 is a section through the towing vehicle coupling of FIG. 20, approximately along a line of intersection R-R, FIG. 25 is a section through a bearing device of the sensor device of FIGS. 19-24, approximately along a line of intersection T-T in FIG. 24, FIG. 26 is a top view of an alternative follower body, FIG. 27 is a top view of a further alternative follower body, FIG. 28 is a side view of a further sensor device which, as an alternative to the sensor device of FIG. 1 is arranged on the towing vehicle coupling shown there, FIG. 29 is a section through the sensor device of FIG. 28, approximately along a line of intersection Q-Q, FIG. 30 is a towing vehicle coupling as a ball coupling, approximately according to the exemplary embodiment of FIG. 9, with another sensor device, FIG. 31 is a section along a line of intersection G-G through a coupling element of the towing vehicle coupling of FIG. 30, FIG. 32 is a follower of the sensor device of the trailer coupling of FIG. 30, of which in FIG. 33 a detail D3 is shown enlarged.

In the exemplary embodiments explained below, components are partly similar or identical in their functionality. In that regard, reference numerals are used which are different by 100 or also in some instances identical.

A towing vehicle coupling 60 is configured as a fifth wheel 60A. The fifth wheel 60A has a coupling element 61 in the form of what is known as a mounting plate 61A. On the mounting plate 61A, and so on the coupling element 61, an insertion receptacle 62 is provided, which can also be referred to as an insertion opening. The insertion receptacle 62 facilitates the insertion of a coupling counter element 81 of a trailer coupling 80, which has what is known as a pin 82 or king pin 82. The pin 82 serves to couple the trailer coupling 80 to the towing vehicle coupling 60, wherein the coupled state is shown in FIGS. 2-8.

The towing vehicle coupling 60 is or can be arranged on a towing vehicle Z. The towing vehicle Z is, by way of example, what is known as a semitrailer or another truck.

By contrast, the trailer coupling 80 is fastened or attachable to a trailer A, by way of example what is known as a semi-trailer.

For coupling the trailer coupling 80 to the towing vehicle coupling 60, the king pin or pin 82 is brought, by way of example, from a rear side of the towing vehicle Z or from an end face 63 of the coupling element 61 to the coupling element 61, wherein in practice the towing vehicle Z moves backwards to couple the semi-trailer and thus the trailer vehicle A.

The trailer vehicle A is supported on an upper side 83 of the trailer coupling 80 or the pin 82. The upper side 83 is connected, by way of example, to an underside of the trailer vehicle A, by way of example, welded or screwed.

The upper side 83 is provided on a flange body 84, the underside of which facing away from the upper side 83 forms a support surface 85 for supporting on the towing vehicle coupling 60. The support surface 85 serves to rest on a bearing surface 65 on the upper side 64 of the mounting plate 61A or the coupling element 61. The bearing surface 65 and the support surface 85 are preferably planar surfaces. So, therefore, the trailer coupling 80 is supported over a large area on the bearing surface 65 in a horizontal plane, so that substantial supporting forces do not act on the actual king pin 82, which for instance engages with a pin section 91 in a coupling receptacle 70 of the towing vehicle coupling 60.

On the end face 63 a slide-on slope 66 is arranged, onto which the support surface 85 can slide when coupling the trailer coupling 80 to the towing vehicle coupling 60. The insertion of the king pin 82 into the coupling receptacle 70 is facilitated by lead-in slopes 68, which laterally delimit the insertion receptacle 62 and extend toward the coupling receptacle 70 in the direction of a narrowing. The lead-in slopes 68 extend from the end face 63 in the direction of a front side 69 of the coupling element 61 or the mounting plate 61A.

The coupling receptacle 70 has a substantially cylindrical inner contour 71, wherein this inner contour 71 does not have to be completely cylindrical, but merely represents a so-to-speak enveloping inner contour. So, the pin section 91 is at least partially supported on the inner periphery of the coupling receptacle 70 with its likewise essentially cylindrical outer circumferential contour 86 so that the king pin 82 can essentially rotate about a joint rotational axis GZ relative to the towing vehicle coupling 60.

On an underside 74 of the coupling element 61A or the mounting plate 61A, a support body 72 is arranged. The support body 72 is provided next to and/or below the coupling receptacle 70. The support body 72 may be plate-like. The king pin 82 is to be inserted past the support body 72 into the coupling receptacle 70 when the trailer coupling 80 is coupled to the towing vehicle coupling 60.

The coupling element 61 is preferably further reinforced on its underside 74 by a rib structure or by ribs 73, making the bearing surface or supporting surface 65 particularly resilient.

The trailer coupling 80 can be locked on the towing vehicle coupling 60 by a locking device 75 of the towing vehicle coupling 60. The locking device 75 comprises a locking body 76, which engages in a locking receptacle 87 of the pin 82, which is provided on the outer circumference 86 thereof.

The pin 82 can be easily inserted into the coupling receptacle 70 in that, by way of example, on its end face 88, i.e. on the side of the pin 82 opposite the flange body 84, a slide-on slope 89 is present. The slide-on slope 89 is provided, by way of example, by a rounded or conical edge section between the outer circumference 86 and the end face 88 or end surface of the pin 82.

The locking body 76 is expediently driven by a manual or motorised locking drive 77, so that it engages in its locking position into the locking receptacle 87 and is moved out of the locking receptacle 87 in its release position, so that the pin 82 can be moved out of the coupling receptacle 70.

From FIGS. 7 and 8, in particular, it can be seen that the trailer coupling 80 can rotate with respect to the towing vehicle coupling 60 preferably about the joint rotational axis GZ, that is to say about a rotational axis which is generally vertical in driving mode, but also joints rotational axes GX and GY, i.e. about a longitudinal axis and a transverse axis, which extend in particular in the vehicle longitudinal direction of the towing vehicle Z or orthogonally at right angles to the vehicle longitudinal direction of the towing vehicle Z.

When the trailer coupling 80 is coupled to the towing vehicle coupling 60, the coupling counter element 81 can pivot relative to the coupling member 61 with respect to the joint axes GX, GY and GZ, so that the coupling element 61 and the coupling counter element 81 form a joint 95. The coupling counter element 81 and the coupling element 61 are in engagement with each other in a bearing region 96. The bearing region 96 is preferably approximately cylindrical.

By way of example, when cornering, the trailer A may pivot relative to the towing vehicle Z substantially about the joint axis GZ. However, the trailer vehicle A can also pivot or rotate relative to the towing vehicle Z during a rolling motion or rolling movement about the joint rotation axis GX and/or during a pitching movement about the joint rotation axis GY.

In all these cases, it is possible to determine a pivoting or rotation of the trailer vehicle A relative to the towing vehicle Z about the joint rotational axis GZ, namely by means of a sensor device 10.

The sensor device 10 is accommodated in a receiving space 67 below the coupling receptacle 70. The receiving space 67 is a receiving space already present in a standard fifth wheel 60A, i.e. a structural modification is unnecessary.

The sensor device 10 is provided for rotational following by the coupling counter element 81, which has a follower surface 90 for this purpose. The follower surface 90 is formed by way of example by the end face 88 or provided thereon. But the slide-on slope 89 or any other region of the outer peripheral contour 86 can form the follower surface 90 wholly or partially, as will become clearer.

The sensor device 10 has a follower 20, which is rotatable by the coupling counter element 81, namely the pin or king pin 82, and about a follower rotational axis M.

The follower 20 has a follower surface 21 for producing a follower contact or a follower connection with the pin 82. The follower surface 21 is provided on a free end face of the follower 20. A peripheral wall 22 which extends away from the follower surface 21 and, by way of example, runs substantially conically or cylindrically.

The follower surface 21 is provided on an end wall 21A, which is designed essentially as a plane or flat wall. The peripheral wall 22 extends away from the end wall 21A.

Needless to say, an annular driving contour can also be provided on a follower according to the invention. Thus, by way of example, an annular circumferential following contour 27, in particular a ring, is provided, which may be in engagement with at least a section of the outer circumference 86 of the pin 82. The circumferential following contour 27 may be partially annular, by way of example comprising one or more following projections, which project towards the pin 82.

The follower body 20A is preferably elastically deformable in the region of the follower surface 21 and/or the circumferential following contour 27 and has an elastic section 28 there. By way of example, the follower body 20A at least in the elastic section, comprises an elastically deformable plastic or rubber.

A side of the follower 20, opposite the end wall 21A, is substantially closed by a base wall 23, so that a substantially encapsulated or protective interior space 29A is formed.

The end wall 21A and the peripheral wall 22 form components of a follower body 20A. The driver body 20A is dome-like or hood-like and, so to speak, closed at the bottom by the base wall 23.

So, the follower body 20A and the base wall 23 substantially encapsulate an interior space 29A. As a result, a protective housing 29 is formed.

The protective housing 29 protects the components arranged in its interior 29A, which are described in detail below.

The sensor device 10 comprises a sensor 11, by way of example a magnetic sensor, which is arranged in the interior space 29A. Signals generated by the sensor 11 are evaluated by an evaluation device 12, which includes, by way of example, a processor 13 and a memory 14. The processor 13 executes program code from at least one program which processes the sensor signals of the sensor 11 and provides them, by way of example, to an interface 15, in particular a bus coupler, for an on-board network N of the towing vehicle Z. The interface 15 is, by way of example, a CAN bus interface, but may also easily be or include another digital or analogue interface.

The evaluation device 12 is arranged, by way of example, on or in a housing 16. Instead of the housing 16, however, it is also possible to provide a printed circuit board or a similar other electronic component carrier, by way of example the processor 13 or the memory 14 or both.

The evaluation device 12, including the sensor 11, is fully protected in the interior space 29A, i.e. within the follower body 20A.

Sensor transmitters 25, by way of example magnets, which are arranged on a sensor carrier 24 serve to excite the sensor 11. The sensor carrier 24 is rotatably mounted on the inside of the peripheral wall 22, that is, in the interior of the follower body 20A. The sensor carrier 24 has a substantially annular shape. On its inner circumference, opposite the sensor 11, the sensor carrier 24 has sensor element receptacles 26 for the sensor transmitters 25.

The sensor transmitters 25 and the sensor element receptacles 26 (see FIG. 6) are arranged annularly around the follower rotational axis M of the follower 20 and form a ring assembly 25B. When the follower 20 rotates about the follower rotational axis M, the sensor transmitters 25 are rotated past the sensor 11, whereby a high measuring accuracy can be achieved.

The sensor device 10, in particular the evaluation device 12, is connected to the vehicle electrical system N via a lead assembly VX connected to the interface 15. So, a wired connection of the sensor device 10 to the on-board network N is thus created, wherein as in the case of exemplary embodiment of FIGS. 9, 10 a wireless connection is also possible, by way of example via infrared, radio or similar.

The follower 20 is rotatably mounted about the follower rotational axis M on a bearing body 30. The bearing body 30 is designed, by way of example, as a bearing shaft or bearing axis. At its end wall opposite the end wall 21A, the bearing body 30 has a flange projection 31, on which a rotary bearing 33 is held. In the region of the base wall 23, a further rotary bearing 34 is provided, which is supported on the bearing body 30 by means of a support body 39. The rotary bearings 33, 34 are preferably rolling bearings, in particular ball bearings, roller bearings or similar, which is why the follower 20 rotates easily about the follower rotational axis M.

However, the bearing body 30 is held in a manner that prevents it rotating with respect to the follower rotational axis M by means of an anti-rotation lock 35 on a holding device 40 which is provided for holding the sensor device 10 on the towing vehicle coupling 60. The holding device 40 has a holding plate 41 on which the bearing body 30 is supported or from which the bearing body 30 projects. The holding plate 41 forms a carrier 47 for the bearing body 30.

By way of example, the anti-rotation lock 35 comprises a screw 36 which is screwed into a screw receptacle 36A. The screw 36 penetrates a screw opening on the holding plate 41, which is eccentric to the follower rotational axis or central axis of the bearing body 30.

The bearing body 30 has an elongated shape extending along the follower rotational axis. Between the rotary bearings 33, 34 a gap is provided, in which the sensor 11 is arranged. The spaced apart or mutually spaced rotary bearings 33, 34 provide optimum support for the follower 20 on the bearing body 30 with respect to the follower rotational axis M, so that the follower 20 is optimally supported transversely to the follower rotational axis M.

The bearing body 30 also has a receiving space 30A for the sensor 11 and the evaluation device 12. A channel 37 for the leads of the lead assembly VX extends from the receiving space A terminating at the holding plate 41. There, a passage opening 46 is provided for the lead assembly VX through which the leads of the lead assembly VX are guided.

The lead assembly VX comprises, by way of example, a data connection DV, which comprises one or more bus lines. Furthermore, supply connections V1, V2, by way of example, a low DC voltage of 5-10 volts and ground, are components of the lead assembly VX.

The follower 20 is movably mounted with respect to the coupling element 61, in particular the coupling receptacle 70, so that in particular during coupling of the trailer coupling 80 to the towing vehicle coupling 60, it participates, so to speak, in various movements of the carrier rotational axis M. Thus, by way of example, the slide bevel 89 deflects the follower 20 from its position shown in FIGS. 4 and 5, in which the follower rotational axis M is, so to speak, aligned or parallel to the joint rotational axis GZ, so that the follower 20 can be deflected from its central position by rotational degrees of freedom DX and DY and/or linear degrees of freedom LX, LY and LZ. The pivoting degrees of freedom or rotational degrees of freedom DX, DY are orthogonal to the follower rotational axis M and orthogonal to each other. By way of example, the follower 20 may pivot with the rotational degree of freedom DX about an axis SX which is parallel to the joint rotational axis GX. During deflection or displacement with the linear degree of freedom of movement LX, the follower 20 can be deflected linearly about the axis SX parallel to the joint rotation axis GX, that is to say moved at right angles to the follower rotational axis M.

The further linear degree of freedom of movement LY permits a deflection or displacement of the follower 20 transversely to the degree of freedom of movement LX or to the X axis and/or along an axis SY which is parallel to the rotational axis GY. When rotated by the rotational degree of freedom DY the follower 20 rotates about this axis SY parallel to the joint rotational axis GY.

The displaceability with the degree of freedom LZ is provided parallel or coaxial to the follower rotational axis M, e.g. about an axis SZ.

All of the aforementioned rotational degrees of freedom DX, DY or linear degrees of freedom LX, LY or LZ make it possible for the follower 20 to be deflected out of its central position when the trailer coupling 80 is coupled to the towing vehicle coupling 60, by way of example, so that its end wall 21A on the end face 88 or the support surface or follower surface of the pin 82 comes to rest flat and parallel. This can be seen in particular in FIGS. 7 and 8. In addition, the rotational follower coupling of the follower 20 is also possible with a deflection transverse to the follower rotational axis M, see in particular FIG. 8. So, by way of example, the follower 20 pivots by the rotational degree of freedom DX or DY in the representation of FIG. 8, but still remains in follower contact with the pin 82.

In a transition region or edge region between the end wall 21A and the peripheral wall 22, an inclined surface 22A or insertion bevel is preferably provided onto which the coupling counter element 81 can slide when coupling to the coupling element 61 i.e., by way of example, when inserted into the coupling receptacle 70. In this case, the coupling element 61 can, by way of example, tilt or pivot the follower 20 transversely to the follower rotational axis M and/or adjust it along the follower rotational axis M.

The mobility of the follower 20 by the degrees of freedom of movement DX, DY, LX, LY and LZ is provided by the holding device 40, on which the bearing body 30 is arranged in a fixed, that is to say immovable, manner.

The holding plate 41 is fixed to the underside 74 of the mounting plate 61A. So, by way of example, retaining projections 42 of the holding plate 41 project from a base body of the same and/or are provided on the corner regions of the holding plate 41. The holding projections 41 have passage openings 43 for screws 44, which are screwed into the coupling element 61 and/or the support body 72 from the underside 74 thereof.

Instead of the screws 44, however, by way of example what are known as welding bolts may be provided, the longitudinal end sections of which are welded to the coupling element 61, advantageously based on what is referred to as capacitor welding or resistance welding.

Between heads 44A of the screws 44 and the holding plate 41, springs 52 of a spring arrangement 51 are provided, which are supported on the one hand on the heads 44A, and on the other hand on the holding plate 41, and thus on the bearing body 40. In this way, the springs 52 act as a force-applying means 50 such that they push the follower 20 in the direction of the pin 82, so that its end wall 21A is pressed against the end face 88 of the pin 82.

The bearing body 30, and therefore the bearing shaft or bearing axis, is arranged in a receiving recess 45 of the holding device 40 or the holding plate 41 and projects in the direction of the coupling receptacle 70 and thus in the state when the trailer coupling 80 is coupled to the towing vehicle coupling 60 towards the pin 82.

An additional force in the direction of a follower coupling is provided by a magnet 53 which is arranged between the bearing body 30 and the end wall 21A of the follower 20. The magnet 53 acts with its magnetic attraction in the direction of the pin 82. By way of example, the magnet 53 is sandwiched between a front side 38 of the flange or flange projection 31 of the bearing body 30 and the end wall 21A.

However, the magnet 53 could cause a disturbance of the sensor 11, by way of example, superimpose on or interfere with the magnetic fields of the magnetic sensor body 25. To avoid this unfavourable situation, a screen 54 is provided, which is arranged between the magnetic sensor transmitters 25 and the magnet 53. By way of example, the screen 54 consists of or has a flux guide plate. The screen 54 is preferably sandwiched between the end face 38 of the bearing body 30 and the magnet 53. A side of the magnet 53 facing the sensor transmitters 25 is preferably completely screened by the screen 54, which is by way of example plate-like.

The screen 54 may also screen the magnet 53 circumferentially, by way of example, with a screening wall 54A, which can project from the plate-like or wall-like screen 54 and be integral therewith.

A multi-axis pivotability with a joint 195 is also provided in a coupling of a trailer coupling 180 to a towing vehicle coupling 160.

The towing vehicle coupling 160 has a ball head 162 as a coupling element 161. The ball head 162 is arranged on a free end region of a coupling arm 165, which is fastened or detachably fastened to the rear of a towing vehicle Z2, by way of example a passenger car. The coupling arm 165 has, by way of example, a mounting section 166, in particular a plug-in section for attachment to the towing vehicle Z2. By way of example, a vehicle mount 170 is arranged on the towing vehicle Z2. The vehicle mount 170 includes a receiving body 171, which is in particular releasably attached to a cross member or other support structure at the rear of the towing vehicle Z2. A plug-in receptacle 172 is present on the receiving body 171 for insertion of the mounting section 166. Forming contours 167, by way of example, wedge slopes or similar other form-fit contours, are provided on a foot region of the mounting section 166 for the positive engagement in form-fitting counter-contours 174 on the receiving body 171. The coupling arm 165 is further retained on the vehicle mount 170 by means of a locking device 175. The locking device 175 comprises, by way of example, a locking body 176, in particular balls, bolts or similar, which can be actuated by an actuating body 177, wherein, in the case of suitable actuation in a locking receptacle, in particular a groove on the inner circumference of the plug receptacle 172 they are actuated in a locking engagement. The actuating body 177 is bolt-like and operable in the longitudinal direction of the mounting section 166, which is indicated by a double arrow. For actuating the actuating body 176, a motor drive or as in the present case, a manual drive 178 can be provided, which can be driven by a manual actuating element 179, in particular a handwheel. When the manual operating element 179 is rotated, by way of example engages a pinion in a tooth system on the actuating body 177 to adjust this in its longitudinal direction, whereby the locking bodies 176 are actuated through unspecified passage openings on the mounting section 166 radially outward from the same in order to engage in the interlock receptacle 173.

Such a locking technique is known. As an alternative to a plug-in mount, however, a fixed attachment of the coupling arm 176 to the towing vehicle Z2 may also be provided, or also supporting by means of a schematically illustrated bearing 270, on which the coupling arm 165 by way of example protrudes between a use position, in which it protrudes from the rear, in particular a bumper, of the towing vehicle Z2, and a non-use position in which it is at least substantially hidden behind and/or under a rear contour of the towing vehicle Z2, by way of example behind a bumper of the towing vehicle Z2. By way of example, the coupling arm 165 can pivot about a pivot axis SA of the bearing 270.

The trailer coupling 180 is configured as a tow ball coupling. As a coupling element 181, there is a coupling receptacle 182 into which the ball head 162 and therefore the coupling element 161 in the sense of a ball joint can engage in a manner known per se. The ball head 162 is mounted in the coupling receptacle 182 so that the two bodies in a bearing area 196 are in engagement with each other.

The coupling counter element 181 can pivot on the coupling element 161 about joint rotational axes GZ, GX and GY, wherein the joint rotational axis GZ is a substantially vertical axis in driving mode, while the other two joint rotational axes GX and GY in the longitudinal direction of the towing vehicle Z2 and in the transverse direction in each case run horizontally. However, these coordinates or alignment of the rotational axes can also be designed differently.

The trailer coupling 180 includes, by way of example, a drawbar or is arranged with a mounting section 183 on a drawbar.

A locking device 185 serves to lock the trailer coupling 180 to the towing vehicle coupling 160. The locking device 185 comprises a locking element 187, by way of example a clamping jaw or closing jaw, which is adjustable on a pivot bearing 184 between an open position OP and a closed position LO, wherein the coupling element 161 can be removed from the coupling counter element 181 in the open position, but not in the closed position LO. A manual actuating element 186, serves for actuating the locking element 187 by way of example with a handle.

As with the coupling of the trailer coupling to the towing vehicle coupling 160, in the case of the trailer coupling 180 in connection with the towing vehicle coupling 160 a pivoting movement of the trailer coupling 180 with respect to the towing vehicle coupling 160 about the joint rotational axis GZ is to be detected for which a sensor device 110 is provided.

The sensor device 110 can be retrofitted to the towing vehicle coupling 160 without having to modify in any way the elements which are to be coupled to one another, namely the coupling element 161 and optionally the coupling counter element 181. In particular, the towing vehicle coupling 160 must not to be altered in the region of a cylindrical section 163, in particular of a shaft, with which the coupling element 161 is held on the coupling arm 165, in particular its upper arm section 164. In this case it is provided that the sensor device 110 is attached to the end section of the coupling arm 165, in particular on the arm section 164 close to the cylindrical section 163, so that a follower 120 of the sensor device 110 can come into follower contact with the trailer coupling 180.

In this case the follower 120 is carried along in rotation on the end face of the coupling element 181, in particular an edge region of the coupling receptacle 182, so that it rotates together with the coupling counter element 181, when this is rotated about the joint rotational axis GZ, by way of example during cornering by a pairing comprising the towing vehicle Z2 and the trailer A2, on which the trailer coupling 180 is arranged.

However, the trailer coupling 180 can pivot not only about the joint rotational axis GZ, which is indeed easily through by the follower 120 and possible through an arrangement of the follower 120 as, by way of example, described in document EP 2 415 620 A1, but also about the joint rotational axes GX and GY. To solve this problem, what is known as a floating or multi-joint bearing of the follower 120 with respect to the coupling element 161, in particular with respect to the coupling arm 165, is provided.

The follower 120 has a follower surface 121 associated with and/or facing the end face 188 of the coupling receptacle 182, which is in particular annular. The follower 120 has a follower body 122, on which the follower surface 121 is provided frontally. A side of the follower body 122 or the follower 120 facing away from the follower surface 121 is configured as a bearing section 123 which is rotatably mounted on a bearing body 130 and additionally rotatable through rotational degrees of freedom DX and DY. The rotational degrees of freedom DX and DY are provided about rotational axes that are parallel to the joint rotational axes GX and GY. Furthermore, it is possible or conceivable for the follower 120 to have a linear displaceability with respect to the bearing body 130, by way of example about axes which are parallel to the joint rotational axes GZ, GX and GY. For example, a linear degree of freedom of movement LZ can be provided parallel to the follower rotational axis M.

The follower 120 is rotatably mounted on the bearing body 130 about the follower rotational axis M and pivotable transversely to the follower rotational axis M, namely with the rotational degrees of freedom DX and DY. Thus, the follower 120 can participate in pivoting movements of the trailer coupling 180 about the joint rotational axes GX and GY, without the follower contact or the coupling between see the follower 120 and the coupling counter 181 being interrupted.

The bearing body 130 is annular. The bearing body 130 is fastened, by way of example, to the arm section 164, by way of example with a screw 141 of a holding device 140. The clamping screw 141 runs, by way of example, radially to the arm section 164 and clamps the bearing body 130 with the coupling arm 165.

Between the follower 120 and the bearing body 130 force-applying means 150 are provided, by way of example with a spring arrangement 151. The spring arrangement 151 includes one or more springs 152 which are supported on the bearing body 130 and the follower body 122 or follower 120. By way of example, the springs 152 are supported on an edge or support section 124 of the follower body 122. The support section 124, by way of example, a step, a recess or similar, is arranged between the bearing section 123 and the follower surface 121.

A further application of force to the follower 120 in the direction of the trailer coupling 180 is carried out, by way of example, by a magnet 153 which is arranged on the carrier 120.

The magnet 153 (there may also be a plurality of magnets 120, in particular arranged on the outer circumference of the follower 120) impinges on the follower 120 with a magnetic force in the direction of the front face 188 or in the direction of the coupling counter element 181.

The process of coupling the trailer coupling to the towing vehicle coupling 160 is illustrated in FIGS. 12 and 13. It can be seen that the coupling counter element 181 comes into follower contact with the follower 120 when coupling to the towing vehicle coupling 160, i.e. that, by way of example, the spring arrangement 151 is compressed when the coupling socket or the coupling receptacle 182 is placed on the ball head 162.

Then, when the coupling counter element 181 of the trailer coupling 180 rotates about the follower rotational axis M, it takes the follower 120 with it, so that the sensor arrangement 110 by means of the sensor or the sensors 111 is able to detect a respective rotation angle position of the follower 120 relative to the bearing body 130 and thus relative to the towing vehicle Z2 or the towing vehicle coupling 160.

On the follower 120 sensor transmitters 125, in particular magnets, are arranged, in particular a ring arrangement with a plurality of sensor transmitters or magnets 125 arranged around the outer periphery of the coupling arm 165, the position of each of which is detectable by at least one sensor 111 or a plurality, by way of example, two sensors 111a and 111b.

The sensors 111 therefore detect the magnetic field of the sensor transmitter 125 and thus the angular position of the coupling counter element 181 to the coupling element 161.

The evaluation device 112 has an interface 115, in particular a radio module or other wireless interface, for communication with the electrical system N. On the towing vehicle Z2, in particular in the region of the vehicle mount 170, a receiver 116, which forms a component of the sensor device 110 or forms a system together with the sensor device 110, is arranged for receiving sensor signals which represent the rotation angle position of the trailer coupling 180 relative to the towing vehicle coupling 160 about the follower rotational axis M. The receiver 116 may have, by way of example, a bus interface and/or a power supply interface or similar for coupling and/or connection to the vehicle electrical system N of the towing vehicle Z2.

By way of example, a battery (not shown), a rechargeable battery or similar may be present for the local power supply of the sensor device 110. A power supply based on a photocell or other device suitable for electrical energy production is perfectly conceivable.

In the exemplary embodiment according to FIG. 17, a sensor device 210 is shown which has similar components to the sensor device 110 already explained. However, a follower 220 of the sensor device 210 is configured at least as a cover, preferably as a protective housing 229, for the at least one sensor 111 and preferably also the bearing body 130.

A follower body 222 corresponds in principle to the follower body 122, but does not engage in an interior of the bearing body 130, but has a cover section 221, in which the bearing body 130 is at least partially included. The follower body 222 may optionally be closed at a side facing away from the follower surface 121 by a cover 223, which is preferably annular and may have a passage opening 225 for the coupling arm 165, in particular its cylindrical section 163 and the upper region of the arm section 164. At the passage opening 225, a seal, in particular a sealing ring, or a seal with, by way of example, silicone or other joint sealant, may be provided. The cover 223 is frontally connected to the follower body 222, by way of example glued, welded or similar. The cover 223 and the follower body 222 together form a protective housing 229 for the at least one sensor 111 and preferably the bearing body 130.

Needless to say, the exemplary embodiment with a protective housing described in connection with FIG. 17, is also quite possible with the exemplary embodiment of FIGS. 10-16, by way of example in that a corresponding cover hood or similar is arranged on the follower 120. A protective housing is also possible in principle in the exemplary embodiment explained below according to FIG. 18, but is omitted in the interests of clarity.

A sensor device 310 is provided for arrangement on the towing vehicle coupling 160. For this purpose, it has a holding device 340, by way of example a retaining ring 342, which is fastened to the cylindrical section 163 and/or arm section 164 of the towing vehicle coupling 160, by way of example, clamped, glued or similar. A corresponding clamping screw is not shown in the drawing in the interests of simplicity. The holding device 340 has a bearing receptacle 341 for a bearing section 331 of a bearing body 330. The bearing section 331 and the bearing receptacle 341 are, by way of example, sections of a ball joint bearing, and therefore have, by way of example, spherical segments or are configured to be spherical segment-like. So, the bearing receptacle 341 is configured, by way of example, in the manner of a receiving shell. Thus, the bearing body 330 can pivot with respect to the retaining ring 342 in a ball joint, so that a follower 320 rotatably mounted on the bearing body 330 about the follower rotational axis M can also, so to speak, join in the movements of the trailer coupling 180 about the joint rotational axes GX, GY so that its follower surface 321 remains in follower contact with the end face 188 of the trailer coupling 180.

The follower 320 is mounted on the bearing body 330 by means of a roller bearing 333, in particular a ball bearing or rolling bearing so that it can rotate about the follower rotational axis M. The roller bearing 333 preferably has low friction, so that the trailer coupling 180 is able to take the follower 320 with it or rotate with particular ease.

The sensor 111 is arranged on the bearing body 330, so that sensor transmitters 25, in particular magnets, on the follower 320, which are arranged in an interior of the bearing body 330, rotate about the follower rotational axis M, but do not pivot transversely thereto or otherwise change their position. As a result, an optimal signal detection by the sensor 111 is readily achievable. The sensor transmitters 25 are arranged, by way of example, on a bearing section 323 of the bearing body 320, on which the roller bearing 333 is supported.

A spring arrangement serves as a force application means 350 with springs 352, which are arranged between the bearing body 330 and the holding means 340 and thus not only the bearing body 330, but also the follower 320 mounted on the bearing body 330 so that it can rotate about the follower rotational axis M, impinge in the direction of the coupling counter element 181. As a force-applying means 350, alternatively or in addition to the springs 352, a magnet or a magnet arrangement 353 may be provided which is arranged on the follower 320 and impinges on it with magnetic force in the direction of the coupling counter element 181.

The sensor device 110 comprises an evaluation device 112, which is arranged, by way of example, on or in the bearing body 130 (FIG. 10). The evaluation device 112 includes, by way of example, a processor 13 and a memory 14, in which one or more program modules may be stored, whose program code is provided by the processor 13 for evaluating the sensor signal of the sensor 111 or the sensors 111a, 111b.

It should be mentioned at this point, however, that the magnetic measuring principles or sensor principles of the sensor device 10, 110 are not the only embodiment. In a sensor device according to the invention, by way of example, inductive, capacitive or optical sensors, also in combination, may be provided. By way of example, instead of the sensor encoders 25, 125 designed as magnets, optical markings, in particular lines or similar, can be provided, which can be detected by an optical sensor 11, 111. Capacitive detection is also readily possible if, by way of example, corresponding electric fields are provided by the sensors.

Instead of sensor transmitters 25, 125, other sensor elements or sensors may also be provided. Thus, the sensory detection of a relative position of a follower relative to a carrier or bearing body can also be performed by at least one sensor, which is arranged on the follower and thus rotates relative to the bearing body or carrier about the follower rotational axis.

The followers 120, 220, 320 may be wholly or partly made of an elastic material, by way of example a flexible plastic, rubber or similar. An elastic resilience in the region of the follower surface 21 is particularly advantageous.

In the case of the sensor device 210, 310, the evaluation device 112 already described can be provided for the respective sensor 111.

Like the sensor device 10, a sensor device 610 is suitable for accompanying the coupling counter-element 81 of the trailer coupling 80 about the follower rotational axis M.

The sensor device 610 comprises a holding device 640, which like the holding device 40 can be secured to the support body 72 of the towing vehicle coupling 60.

The holding device 640 has a holding plate 641, on which a holding section 645 is provided for fastening a bearing body 630. Fastening sections 645A, 645B extend from the holding section 645 and have, by way of example, a stepped design. By way of example, the sections 645, 645A and 645B extend in a stepped arrangement to each other. On the fastening sections 645A, 645B, retaining projections 642 are provided which, for example, are suitable for a screw connection with the support body 72 of the towing vehicle coupling 60 by means of, by way of example, the screws 44.

The bearing body 630 serves to mount the follower 620 about the follower rotational axis M. By way of example, an upper rotary bearing 33 is arranged on an end region of the bearing body 630 facing away from the holding plate 641, in particular on a flange projection 31. Spaced apart from the bearing 33, with respect to the follower rotational axis M a further bearing 34 is provided. The bearings 33, 34 form a bearing arrangement 32 which supports the follower 20 rotatably about the follower rotational axis M with respect to the bearing body 630. The rotary bearing 34 is arranged on a support body 39, which in turn is supported on the bearing body 630.

The follower 620 is similar to the follower 20 insofar as it has a peripheral wall 622 and an end wall 621A and, by way of example, is substantially cylindrical or conical, in particular mushroom-shaped. The end wall 621A is provided for rotational driving by the coupling counter element 81.

The follower 620 forms a protective housing 29 with a protected interior space 29A, in which the electronic components of the sensor device 610 are arranged, in particular the sensor 11 already described. This is located in the interior of the sensor carrier 24, on which at least one sensor transmitter 25, by way of example a magnet, is arranged for actuating the sensor 11.

The bearing body 630 has a channel 637, which communicates with a passage opening 646 of the holding plate 641, so that a lead assembly VX can be run to the evaluation device 12 and the sensor 11 through these two components.

On the end wall 621A, a magnet 653 in the manner of the magnet 53 is arranged. The magnet 653 is arranged in a screen 654 having, by way of example, a base wall 654A and a peripheral wall 654B. The base wall 654A is penetrated at right angles by the follower rotational axis, while the peripheral wall 654B extends about the follower rotational axis M. Therefore, the sensor 11 is screened from the magnet 653 and cannot influence this.

With sensor device 610, mobility of holding device 640 relative to support body 72 or towing vehicle coupling 60 is also achieved similarly to sensor device 10. Instead of the screws 44, however, bearing bodies 644 are provided which penetrate the passage openings 643 of the holding device 640 on the holding projections 642 and are connected with attachment sections 644C to the towing vehicle coupling 60, in particular the support body 72, by way of example by screwing, gluing or welding. By way of example, screw threads may be provided on the attachment sections 644C. The bearing bodies 644 advantageously have a bolt-like design.

The bearing bodies 644 form components of bearing devices 655, which support the holding device 640 so that it can pivot and displace with respect to the support body 72. In fact, the bearing devices 655 each comprise a pivot bearing 656, in particular a multi-axis rotary bearing, namely a ball bearing and a sliding bearing 657. By way of example, bearing bodies 658 are accommodated in the passage openings 643, which can also be referred to as bearing receptacles. On the bearing bodies 658 bearing receptacles 656A of the pivot bearing 656 are provided. In the bearing receptacles 656A, a bearing body 659 is received in the manner of a ball or partial ball. The bearing body 656 can pivot multi-axially in the bearing receptacle 656A, by way of example about the axes SX and/or SY or in each case axes parallel thereto.

In the bearing body 659 a bearing receptacle 657A, namely a sliding bearing receptacle, is provided for the bearing body 644. The bearing body 644 is therefore longitudinally displaceable in the bearing receptacle 657A along a displacement axis ZZ, which is indicated by a double arrow PZ. The pivotability of the bearing body 644 with respect to the bearing receptacles 655A or the pivotability of the bearing body 658 about the bearing body 659, so that the holding device 640 can pivot with respect to the bearing body 644, is indicated by dashed lines. So, therefore, the holding device 640, in particular the holding plate 641, can be displaced both axially about the axis direction PZ with respect to the respective bearing body 644, and also pivoted about mutually angular pivot axes, which at the point of intersection of the central longitudinal axis of the bearing body 644 and the centre plane of the holding plate 641 are located in the region of the respective retaining projection 642.

The drawing shows how the retaining plate 641 can be deflected due to the mobility on the rotary bearings 656 and sliding bearings 657. However, the deflection shown in the drawing has been exaggerated. In practice, a slight deflection of, for example, a few degrees is sufficient to enable the coupling counter-element 81 to deflect or to facilitate a deflection of the follower 620 from its middle position for sliding on the end wall 621A To improve the mobility of the holding plate 641 with respect to the fixed components of the towing vehicle coupling 60, for example of the support body 72, it is advantageously provided that the bearing bodies 658 are received in the passage openings 643 with a movement play transversally to the displacement axis ZZ or longitudinal axis of the sliding bearing 657. By way of example, a bearing region 643A of the holding plate 641 protrudes in the region of the respective passage opening 643 into a bearing receptacle 658A, by way of example a bearing groove, on the bearing body 658. By way of example, the bearing region 643A may be circular, but may comprise other contours, such as a slot. Accordingly, by way of example, an oval or elongated bearing region 643B may be provided, which is indicated schematically. The bearing receptacle 658A may be, by way of example, a circumferential groove on the bearing body 658. Thus, the bearing body 658 is transversely movably received in the passage opening 643 transversely to the direction of movement, which is indicated by the double arrow PZ. In this way tensions can be advantageously avoided.

Alternatively or additionally, it would also be possible, by way of example, to connect the bearing body 658 to the retaining plate 641 by means of an elastomer, so that the bearing body 658 is accommodated, as it were, floating in the retaining plate 641.

The holding plate 641 is also subjected to force with respect to the bearing bodies 644, namely by a force-applying means 650. The force-applying means 650 comprises a spring arrangement 651 with springs 652. The springs 652 are respectively supported on a head 644A of a bearing body 644 on the one hand and on the other hand on a component that is stationary or immovable with respect to the holding plate 641 or the holding device 640, by way of example, one of the bearing body 658 or 659. The springs 652 are penetrated by a bearing section 644B of a respective bearing body 644. The bearing section 644B is longitudinally slidably received in the bearing receptacle 657A.

The follower 620 is constructed in several parts. It has a follower carrier 667, the basic contour of which is similar to the follower 20 namely having a front wall 668 and the circumferential wall 622. The follower carrier forms the protective housing for, inter alia, the sensor 11 and the evaluation device 12 and is rotatably supported by the bearing assembly 32 on the bearing body 630.

On the follower carrier 667 a follower body 660 is releasably secured, by way of example glued, screwed or similar. The follower body 660 forms, so to speak, the wear part, which is easily replaceable, while the follower carrier 667 remains permanently on the bearing body 630.

By way of example, a bottom 666 of the follower body 660 is glued to the end wall 668 and/or is lies flat on this. For releasable attachment, by way of example, a screw arrangement with screws 665 may be provided, which penetrate a base body 661 of the follower body 660 at passage openings 664 and are screwed into screw receptacles 669 of the carrier 667.

Centrally with respect to the follower rotational axis M, the follower body 660 has a receptacle 663 for the magnet 653. By way of example, the screen 654 is accommodated in the receptacle 663. At the radial outer circumference of the receptacle 663, a plurality of recesses 662 extend which, by way of example, ensure that the follower body 660 is more easily compressible at its edge region, which can facilitate a sliding of the coupling counter element 81 on the follower 620. In particular, the edge region of the follower body 660 extending around the recesses 662 has an obliquely flat slope and has the bevel 622A. However, the recesses 662 can also serve to ensure that the follower body 660 is particularly light or that little material is necessary for it. But the recesses 662 can also serve to ensure that the follower body 660 is dimensionally stable.

The magnet 663 and/or the screen 654 may be glued, inserted or screwed into the material of the receiving body 660. But it is also possible to over-mould the magnet 653 and/or the screen 654 with the material of the follower body 660.

The end wall 621A or end face of the follower 620 is configured as a frictional engagement surface 681 and serves for the frictional following contact of the follower 620 with the counterpart coupling element 81. It would then be possible to provide the frictional engagement surface 681 directly at a free end face or flat side 653A of the magnet 653 protruding in front of the receiver 663, by way of example in that the particles 683, which are explained below, are firmly connected to this free end face 653A on the basis of a bond or other lamination.

In the present case, however, a separate frictional engagement body 680 is provided. The frictional engagement body 680 is, by way of example, plate-like or foil-like and fixedly arranged on the free end face 653A of the magnet 653, by way of example adhesively bonded. However, the frictional engagement body 680 can also be formed by a material of the follower body 660 which encloses the magnet 653 and in which the particles 683 are directly embedded.

On its side remote from the magnet 653 the frictional engagement body 680 has the frictional engagement surface 681. The particles 683 project from a support surface 682 of the frictional engagement body 680. By way of example, frictional engagement body 680 is adhesively bonded to the front side 653A of the magnet 653 on the basis of an adhesive layer 686.

The frictionally engaging body 680 has a main body or a base layer 685, which has the adhesive layer 686 on opposite sides on the one hand, and a support layer 684 for the particles 683 on the other hand. The support layer 684, which may also be referred to as a bonding layer or adhesive layer, carries the particles 683. These are, as it were, embedded in the support layer 684 and protrude freely therefrom.

The particles 683 project from the support surface 682, by way of example in the manner of pyramids. Thus, their tips 687, by way of example pyramid apexes, protrude spine-like from the bearing surface 682, so that they can penetrate spine-like into the end face 88 of the coupling counter element 81, that is to say the follower surface or frictional engagement surface of the coupling counter element 81. From the tips 687 the side surfaces of the particles 683 extend toward the support surface 682, whereby edges 688 are formed between the respective side surfaces.

A central surface 690 of the frictional engagement surface 681 is without particles 683. There, the support surface 682 is exposed. The central surface 690 is penetrated by the follower rotational axis M. From the central surface 690 or the follower rotational axis M, the particles 683 run in rays 689, that is to say they are regularly arranged. The tips 687 and the free end regions of the particles 683 project approximately equidistantly from the support surface 682. Thus, the peaks 687 do not "puncture" an envelope 691. The envelope 691 is a flat surface or even surface corresponding to the flat or even surface of the end face 88 of the coupling counter element 81.

The mere radial arrangement of the particles 683 on the support surface 682 results in a higher concentration of particles 683 near the central surface 690 than at the radial outer edge region of the frictional engagement body 680 or the friction engagement surface 681. So, by way of example, grease or similar other soiling is forced into the wide spaces between the mandrel-like particles 683, so that their tips 687 protrude from the layer of soiling or layer of grease not shown in the drawing and produce the frictional engagement with the coupling counter element 81.

The particles 683 are arranged annularly or circularly around the follower rotational axis M. Of course, a chaotic arrangement or also an arrangement with different distributions or areas would also be possible. Also, the angular distance between the particles 683 may be smaller at the radially outer periphery than near the central surface 690, unlike in the drawing.

The particles 683 are preferably corundum, quartz, rock particles or similar other hard material with sharp edges and in any event with peaks.

The support layer 684 contains, by way of example, glue and/or epoxy resin in order to adhere or bond the particles 683 to the base layer 685. The support layer 684 and/or the base layer 685 and/or the adhesive layer 686 can be elastic components and/or consist of an elastic material or contain an elastic material.

For better retention of particles on a frictional engagement surface or support surface a cover layer 692, by way of example, a wax or similar may also be provided. It is advantageous, however, if at least some of the edges 688, but in any case the pyramid tips or tips 687, of the particles 683 protrude from the cover layer 692. The cover layer 692 expediently consists of a softer material than the particles 683, so that they can create the contact with the coupling counter element 81.

The distribution and/or arrangement of particles on a frictional engagement surface may also be configured differently than in the aforementioned embodiment, which should be more noticeable due to frictional engagement bodies 780, 880. These substantially correspond to the frictional engagement body 680, i.e. by way of example in that a support layer, a base layer and an adhesive layer are present. However, the particles 683 of the frictional engagement surfaces 781, 881 of the frictional engagement bodies 780, 880 could also be provided directly on the follower body 660 or the magnets 653.

The particles 683 are arranged on the frictional engagement body 780, by way of example, in rings 793, 794, 795, which run concentrically around a centre of the circular frictional engagement body 780. Between the rings 793-795, the support surface 782 is exposed and it is in this that the particles 683 are embedded in the rings 793, 794, 795. The centre 790 or the central surface 790 of the frictional engagement body 780 is also devoid of particles 683, so that there the support surface 782 is exposed for direct frictional engagement of the coupling counter element 81.

In the frictional engagement body 880, the particles 683 are arranged in angle segments 893 which, by way of example, radiate around the follower rotational axis M. Between the angle segments 893, where the particles 83 of the frictional engagement surface 881 of the frictional engagement body 880 are located, angle segments of the support surface 882 are likewise exposed, thus having no particles.

A sensor device 410 has, as it were, a central mounting for a follower 420, which substantially resembles the follower 620. The follower 420 therefore also has a follower body 460 intended for the actual frictional engagement or following contact with the coupling counter element 81, which resembles the follower body 660, and a follower carrier 467 which carries the follower body 460 in the same way as the follower carrier 667.

The same and similar components, including the magnet 653, thus have the same reference numerals, which have already been explained. Accordingly, the follower carrier 467 is supported on the bearing body 430 by means of the rotary bearings 33, 34, which have a longitudinal spacing with respect to the follower rotational axis M, which also has a support body 39 for supporting the lower rotary bearing 34 in the drawing. which is penetrated by the bearing body 430. Instead of the support body 39 a flange projection or similar can of course also be provided, which projects radially from the bearing body 430.

The protective housing, which is formed by the follower carrier 667, is covered by a base wall 23, which is penetrated by the bearing body 430.

The bearing body 430 is supported on a holding device 440 which is connected to the support body 72, namely by means of screws 444 which are screwed into the support body 72 and whose heads 444A are supported on a holding plate 441 of the holding device 440. The holding plate 441 is stationary relative to the towing vehicle coupling 60, in particular its support body 72. The mobility of the carrier 420 is ensured by a bearing device 455, with which the bearing body 430 is movably mounted on the holding device 440, in particular the holding plate 441, namely slidably with a linear degree of freedom of movement LZ parallel to the follower rotational axis M, as well as across to the follower rotational axis M and also by one or more rotational degrees of freedom, namely about axes SY and SX.

The bearing device 455 has for this purpose a multi-joint rotary bearing 456 designed as a ball bearing. By way of example, for this purpose, a bearing body 459, which is spherical on its outer circumference or spherical segment-shaped, is pivotally mounted in a bearing body 458, which is stationary with respect to the holding device 440, by way of example, arranged on the holding plate 441, namely in a bearing receptacle 456A.

The bearing body 459 in turn has a sliding bearing receptacle 457 A, which is provided in a sliding bearing 457. The bearing receptacle 457A is penetrated by a bearing section 433 of the bearing body 430, which protrudes from the follower 420. The bearing section 433 can thus be displaced linearly in the bearing receptacle 457A with respect to the axis GZ or the follower rotational axis M and pivot about a single axis or multiple axes transverse to this axis by means of the rotary bearing 456. The linear displaceability is shown in dashed lines in the cross-sectional view. The pivoting mobility is also indicated by dashed lines in the side view, but with particular graphical emphasis.

Of course, the frictional engagement surface 681 can also be designed differently, so that, by way of example, one of the frictional engagement bodies 780 or 880 is arranged there.

Of course, in the case of the sensor device 10, one of the frictional engagement bodies 680, 780 or 880 can also be readily arranged, by way of example adhesively bonded or similar, on the end wall 21A. Furthermore, the particles 683 can also be embedded directly in the end wall 21A. By way of example, the follower 20 is made of a plastic material, in particular an elastic plastic material, in particular a rubber material, into which particles, in particular corundum, glass fragments or similar other sharp-edged particles can be readily interspersed during the manufacturing process.

The principle of having particles on frictional engagement surfaces can also be easily applied to the sensor devices 110, 210 or 310, by way of example, if the follower surfaces 121, 321 are provided with particles 683.

On these follower surfaces projections or follower projections or form-fitting projections can easily be provided, similar to the concept explained below:

A sensor device 510 for a towing vehicle coupling 560 is arranged, by way of example, directly on its coupling element 561, by way of example a coupling ball 562. The follower 520 is annular and extends near the equator of the ball 562, but not on the equator of the ball. The annular follower 620 can rotate about a follower rotational axis M, about which it is rotatably mounted on the coupling element 561. The follower 520 is rotatably supported in a bearing receptacle 518 extending on the radially outer periphery, close to the ball surface of the ball 562, over the entire outer circumference thereof. Of course, a partial annular configuration of a follower of the type described below would also be possible.

Furthermore, the coupling element 561 has a sensor receptacle 517, in which an evaluation device 512 and a sensor 511 for detecting signals from sensor transmitters 25, by way of example magnets, are arranged. The follower 520 has a follower body 527, which is fastened to a follower carrier 524. The follower carrier 524 has one or more sensor transmitters 25, which are arranged in a ring and extend around the follower rotational axis M. Thus, when the follower carrier 524 rotates about the follower rotational axis M, the magnets or other sensor transmitters rotate past the sensor 511, so that this can detect a respective angular position.

For better support of the evaluation device 512 in the sensor receptacle 527, this is embedded, by way of example, in a holding mass 519 or similar other holding body. This body also comprises a section of the bearing groove or bearing receptacle 518.

The follower 520, in particular its follower body 660, has at its radial outer circumference 522 a plurality of follower protrusions 521, between which spacings or gaps 523 are arranged. The follower projections 521 can be pushed into the gaps 523, when a pressure coming radially from the outside, namely by, by way of example, the trailer coupling 180 or its coupling counter element 181, acts on a follower projection 521.

On each of the follower projections 521 a plurality of particles 683, by way of example, rock particles, corundum, diamond or similar, are arranged, the tips of which project radially outward from the respective follower projection 521 and accordingly are able to create a frictional contact on the coupling counter element 181 when the trailer coupling 180 is coupled to the towing vehicle coupling 560.

The coupling element 561 is arranged on a coupling arm 565 and can be adjusted by means of a bearing 570 between a use position GS and a non-use position NG, by way of example, pivot about a single axis or multiple axes and/or linearly displaced or similar. Of course, it is possible to lock the coupling arm 565 in the use position GS and/or the non-use position NG by a locking device, not shown, and/or to adjust it manually or by motor between the two positions. A suitable drive motor is not shown, for reasons of simplicity.

In the non-use position NG, the coupling arm 565 is hidden behind a rear contour, by way of example a rear apron, of a towing vehicle Z3, on which the towing vehicle coupling 560 is arranged.

| | | | |
|---|---|---|---|
| 10 | Sensor device | 60 | Towing vehicle coupling |
| 11 | Sensor | 60A | Fifth-wheel coupling |
| 12 | Evaluation device | 61 | Coupling element |
| 13 | Processor | 61A | Mounting plate |
| 14 | Memory | 62 | Insertion receptacle |
| 15 | Bus coupler interface | 63 | End face in the backward direction of travel |
| 16 | Housing | 64 | Upper side 61 |
| | | 65 | Bearing surface/Supporting surface |
| | | 66 | Slide bevel |
| | | 67 | Receiving space below 70 |
| | | 68 | Insertion bevels on 62 |
| | | 69 | Front side |
| 20 | Follower 20A Follower body | | |
| 21 | Follower surface 21A End wall | 70 | Coupling receptacle pin up |
| 22 | Peripheral wall 22A Bevel | 71 | Cylindrical inner contour |
| 23 | Base wall | 72 | Support body |
| 24 | Sensor carrier | 73 | Ribs Rib structure |
| 25 | Transmitter/Magnet | 74 | Underside |
| 25B | Ring arrangement | 75 | Locking device |
| 26 | Sensor element receptacle | 76 | Locking body |
| 27 | Circumferential follower contour | 77 | Locking drive |
| 28 | elastic section | 78 | |
| 29 | Protective housing 29A Interior | 79 | |
| 30 | Bearing body 30A Receiving space | | |
| 31 | Flange projection | 80 | Trailer coupling |
| 32 | Bearing arrangement | 81 | Coupling counter element |
| 33 | Pivot bearing from above | 82 | Pin/King pin |
| 34 | Pivot bearing from below | 83 | Upper side |
| 35 | Anti-rotation lock | 84 | Flange body |
| 36 | Screw 36A Screw receptacle | 85 | Support surface on 84 |
| 37 | Channel for leads | 86 | Outer circumference contour of 82 |
| 38 | Front face at magnet | 87 | Locking receptacle |
| 39 | Support body of lower pivot bearing | 88 | Front face |
| 40 | Holding device | 89 | Slide-on slope |
| 41 | Holding plate | 90 | Follower surface |
| 42 | Holding projections of 41 | 91 | Pin section |
| 43 | Passage opening for screws | | |
| 44 | Screws 44A Head | | |
| 45 | Receiving recess for bearing body | | |
| 46 | Passage opening for leads | 95 | Joint |
| 47 | Carrier | | |
| 50 | Force-applying means | Z | Towing vehicle Z2 Z3 |
| 51 | Spring arrangement | N | On-board network |
| 52 | Springs | A | Trailer vehicle A2 |
| 53 | Magnet | BR | Direction of viewing |
| 54 | Screen 54A Screening wall | | |
| 110 | Sensor device | | |
| 111 | Sensor | | |
| 112 | Evaluation device | | |
| 13 | Processor | | |
| 14 | Memory | | |
| 115 | Interface/radio module | | |
| 116 | Receiver | 160 | Towing vehicle coupling |
| | | 161 | Coupling element |
| | | 162 | Ball head |
| | | 163 | Cylindrical section/Shaft |

| | | | |
|---|---|---|---|
| 120 | Follower | 164 | Arm section |
| 121 | Follower surface | 165 | Coupling arm |
| 122 | Follower body | 166 | Mounting section |
| 123 | Bearing section | 167 | Positive-locking contour |
| 124 | Support section for springs | 168 | Recess |
| 125 | Transmitter Magnet | | |
| | | 170 | Vehicle mount 270 Bearing |
| 130 | Bearing body | 171 | Follower body |
| | | 172 | Plug-in receptacle |
| 140 | Holding device | 173 | Locking receptacle |
| 141 | Clamping screw | 174 | Positive-locking counter-contour |
| | | 175 | Locking device |
| 150 | Force-applying means | 176 | Locking body |
| 151 | Spring arrangement | 177 | Actuating body |
| 152 | Springs | 178 | Drive/Gearbox |
| 153 | Magnet | 179 | Manual actuating element |
| | | 180 | Trailer coupling |
| GZ | Joint rotational axis z | 181 | Coupling counter element |
| GX | Joint rotational axis x | 182 | Coupling receptacle |
| GY | Joint rotational axis y | 183 | Mounting section for drawbar |
| | | 184 | Swivel bearing |
| | | 185 | Locking device |
| M | Follower rotational axis | 186 | Manual actuating element |
| | | 187 | Locking element |
| DZ | Degree if freedom of rotation Z = M | 188 | Front face about coupling receptacle |
| DX | Degree of freedom of rotation X | | |
| DY | Degree of freedom of rotation Y | | |
| LX | Lin. degree of freedom of movement | | |
| LY | Lin. degree of freedom of movement | 195 | Joint |
| LZ | Lin. degree of freedom of movement | | |
| | | DV | Data connection |
| | | V1 | Supply connection |
| | | V2 | Supply connection |
| | | VX | Lead arrangement |
| 645 | Holding section | | |
| 641A | 641B Fastening parts | | |
| 644 | Bearing body | | |
| 644A | Head | | |
| 644B | Bearing section | | |
| 644C | Fastening section | | |
| 650 | Force-applying means | | |
| 651 | Spring arrangement | | |
| 652 | Springs | | |
| 653 | Magnet | | |
| 653A | Exposed front face of 653 | | |
| 654 | Screening | | |
| 654A | Base wall | | |
| 654B | Peripheral wall | | |
| 655 | Bearing device | | |
| 656 | Pivot bearing/Ball bearing | | |
| 656A | Bearing recess | | |
| 657 | Sliding bearing | | |
| 657A | Bearing recess | | |
| 658 | Bearing body in 643 | | |
| 659 | Bearing body Ball | | |
| 660 | Follower body | 680 | Frictional engagement body |
| 661 | Main body | 681 | Frictional engagement surface |
| 662 | Recesses | 682 | Support surface |
| 663 | Receptacle for magnet | 683 | Particle |
| 664 | Passage opening for screws | 684 | Support layer Bonding layer |
| 665 | Screws | 685 | Base layer |
| 666 | Underside of 660 | 686 | Adhesive layer |
| 667 | Follower carrier | 687 | Pyramid apexes |
| 668 | End wall | 688 | Edges of the particles |
| 669 | Screw receptacles | 689 | Rays |
| | | 690 | Central surface |
| | | 691 | Enveloping |
| | | 692 | Cover layer |

The invention claimed is:

1. A sensor device for a towing vehicle coupling or as a component of a towing vehicle coupling, with which a trailer vehicle adapted to be coupled to a towing vehicle wherein the towing vehicle coupling has a coupling element for detachably coupling to a coupling counter element, wherein the coupling element is securable to the towing vehicle and the coupling counter element-is securable to the trailer vehicle, and in a coupled state forming a joint, wherein the coupling element and the coupling counter element are rotatable relative to one another about at least one joint rotational axis, wherein the sensor device has a follower, mounted on a bearing body of the coupling element such that it can rotate about a follower rotational axis, for detecting a rotation of the coupling counter element relative to the coupling element about the at least one joint rotational axis, wherein the follower can rotate about the follower rotational axis by rotationally following the coupling counter element in a rotation about the at least one joint rotational axis, and the sensor device has at least one sensor for detecting a respective rotational position of the follower relative to the bearing body in relation to the follower rotational axis, wherein the follower is arranged outside a bearing region of the joint, in which the coupling element and the coupling counter element are engaged with one another, and the at least one sensor is arranged inside the follower and/or the follower forms a protective housing for the at least one sensor, wherein the follower is mounted such that it moves relative to the coupling element for providing or maintaining a follower coupling to the coupling counter element by at least one degree of freedom of movement, that is different to the rotatability about the follower rotational axis.

2. A sensor device according to claim 1, wherein the bearing body is arrangeable on the coupling element of the towing vehicle or is formed by the coupling element.

3. A sensor device according to claim 1, wherein it is configured and/or provided for an arrangement in a receiving space existing at a coupling receptacle or adjacent to a support plate of the towing vehicle coupling.

4. A sensor device according to claim 1, further comprising a holding device for holding the follower on an end face of a king pin and/or for attachment to opposite sides of the coupling receptacle.

5. A sensor device according to claim 1, wherein the coupling element has a coupling receptacle, for receiving a king pin of the coupling counter element.

6. A sensor device according to claim 1 wherein the at least one degree of freedom of movement comprises or is formed by at least one rotational degree of freedom for rotating the follower about at least one rotational axis at an angle to a carrier rotational axis.

7. A sensor device according to claim 1, wherein the follower is gimbal-mounted on the coupling element, wherein cardan axes are different from the follower rotational axis.

8. A sensor r device according to claim 1, wherein the at least one degree of freedom of movement comprises at least one linear degree of freedom of movement.

9. A sensor device according claim 1, wherein the follower is mounted such that it can displace with respect to the coupling element about at least one displacement axis or linear axis.

10. A sensor device according to claim 1, further comprising a holding device for holding the bearing body against rotation with respect to the follower rotational axis on the coupling element.

11. A sensor device according to claim 1, further comprising a fastening device for attachment to the coupling element or on the coupling element of the towing vehicle coupling.

12. A sensor device according to claim 1, wherein a holding device supports the bearing body with at least one degree of freedom of movement suitable for providing or maintaining the follower coupling of the follower to the coupling counter element, which is different from the rotatability about the follower rotational axis, with respect to the coupling element.

13. A sensor device according to claim 1, wherein the holding device comprises a carrier for the bearing body which is movably supported on the coupling element.

14. A sensor device according to claim 13, wherein the bearing body is fixedly connected to the carrier or on the carrier with at least one degree of freedom of movement that is different from the rotatability about the follower rotational axis.

15. A sensor device according to claim 1, wherein the bearing body is mounted with respect to the coupling element by at least one ball joint, which is fixed against rotation on the coupling element with respect to the follower rotational axis.

16. A sensor device according to claim 1, wherein the bearing body is movably mounted with respect to the coupling element of the towing vehicle coupling with the exception of a rotatability about the follower rotational axis that is floating and/or with at least two degrees of freedom of movement.

17. A sensor device according to claim 1, wherein the follower is rotatably mounted on the bearing body on at least two rotary bearings between which with respect to the follower rotational axis a distance is provided, and/or that the follower is rotatably mounted on mutually opposite longitudinal end regions of the bearing body with respect to the follower rotational axis.

18. A sensor device according to claim 1, wherein the follower is mounted on the bearing body with at least one rolling bearing.

19. A sensor device according to claim 1, wherein the follower comprises an end face penetrated by the follower rotational axis, which is adapted for following by the coupling counter element.

20. A sensor device according to claim 1, wherein an end face of the follower penetrated by the follower rotational axis comprises at least one ring or is formed by the ring and/or an annular or partially annular circumferential follower contour.

21. A sensor device according to claim 1, further comprising a force-applying means for a force application of the follower in the direction of the coupling counter element.

22. A sensor device according to claim 1, further comprising a spring arrangement for providing a spring force impinging on the follower in the direction of the coupling counter element.

23. A sensor device according to claim 1, wherein the follower has at least one elastic section for elastic deformation by the coupling counter element.

24. A sensor device according to claim 1, further comprising a magnet arrangement with at least one magnet for providing a magnetic attraction force impinging on the follower in the direction of the coupling counter element.

25. A sensor device according to claim 1, wherein the magnet arrangement is configured and/or arranged for actuating or exciting the at least one sensor and/or that it has a screening device for screening the at least one sensor against magnetic influences of the magnet arrangement.

26. A sensor device according to claim 1, wherein at least one frictional engagement surface for a frictional contact with the coupling counter element and/or at least one positive locking contour for a positive engagement of the coupling counter element and the follower is arranged on the follower.

27. A sensor device according to claim 26, wherein a plurality of particles for contact with the coupling counter element are arranged on the at least one frictional engagement surface.

28. A sensor device according to claim 1, wherein the follower has an inclined surface, along which the coupling counter element can slide and/or by means of which the coupling counter element can actuate the follower with at least one degree of freedom of movement different from a rotation about the follower rotational axis.

29. A sensor device according to claim 1, wherein the follower has at least one follower ring or annular section.

30. A sensor device according to claim 1, wherein the follower has a dome-shaped or tower-like follower body.

31. A sensor device according to claim 1, wherein the follower forms or comprises a protective housing for a bearing body supporting the follower.

32. A sensor device according to claim 1, further comprising a sensor or sensor transmitter mounted so that it can rotate about the follower rotational axis, which is rotationally coupled or rotationally connected to the follower.

33. A sensor device according to claim 1, further comprising a ring arrangement of a plurality of sensors or sensor transmitters arranged about the follower rotational axis.

34. A sensor device according to claim 1, wherein the follower has a follower carrier forming a protective housing for the at least one sensor, to which the carrier body is detachably fastened, wherein the at least one frictional engagement surface is provided on the follower body.

35. A sensor device according to claim 1, wherein the follower body has a slide-on slope for sliding on the coupling counter element and/or circularly surrounds the follower carrier and/or forms a cap or lid for the follower carrier and/or protrudes transversely to the follower rotational axis from the follower carrier.

36. A sensor device according to claim 1, wherein the towing vehicle coupling is designed as a fifth wheel and the coupling element has a coupling receptacle for receiving a king pin of the coupling counter element or that the coupling element has a coupling ball or a coupling projection for engagement in a coupling receptacle of the coupling counter element.

37. A towing vehicle coupling with a sensor device according to claim 1.

38. A sensor device for a towing vehicle coupling or as a component of a towing vehicle coupling, with which a trailer vehicle adapted to be coupled to a towing vehicle-wherein the towing vehicle coupling has a coupling element for detachably coupling to a coupling counter element, wherein the coupling element is securable to the towing vehicle and the coupling counter element-is securable to the trailer vehicle, and in a coupled state forming a joint, wherein the coupling element and the coupling counter element are rotatable relative to one another about at least one joint rotational axis, wherein the sensor device has a follower, mounted on a bearing body of the coupling element such that it can rotate about a follower rotational axis, for detecting a rotation of the coupling counter element relative to the coupling element about the at least one joint rotational axis, wherein the follower can rotate about the follower rotational axis by rotationally following the coupling counter element in a rotation about the at least one joint rotational axis, and the sensor device has at least one sensor for detecting a respective rotational position of the follower relative to the bearing body in relation to the follower rotational axis, wherein the follower is arranged outside a bearing region of the joint, in which the coupling element and the coupling counter element are engaged with one another, and the at least one sensor is arranged inside the follower and/or the follower forms a protective housing for the at least one sensor, a holding device for holding the bearing body against rotation with respect to the follower rotational axis on the coupling element.

39. A sensor device for a towing vehicle coupling or as a component of a towing vehicle coupling, with which a trailer vehicle adapted to be coupled to a towing vehicle-wherein the towing vehicle coupling has a coupling element for detachably coupling to a coupling counter element, wherein the coupling element is securable to the towing vehicle and the coupling counter element-is securable to the trailer vehicle, and in a coupled state forming a joint, wherein the coupling element and the coupling counter element are rotatable relative to one another about at least one joint rotational axis, wherein the sensor device has a follower, mounted on a bearing body of the coupling element such that it can rotate about a follower rotational axis, for detecting a rotation of the coupling counter element relative to the coupling element about the at least one joint rotational axis, wherein the follower can rotate about the follower rotational axis by rotationally following the coupling counter element in a rotation about the at least one joint rotational axis, and the sensor device has at least one sensor for detecting a respective rotational position of the follower relative to the bearing body in relation to the follower rotational axis, wherein the follower is arranged outside a bearing region of the joint, in which the coupling element and the coupling counter element are engaged with one another, and the at least one sensor is arranged inside the follower and/or the follower forms a protective housing for the at least one sensor, wherein a holding device supports the bearing body with at least one degree of freedom of movement suitable for providing or maintaining the follower coupling of the follower to the coupling counter element, which is different from the rotatability about the follower rotational axis, with respect to the coupling element.

* * * * *